US 6,654,377 B1
Nov. 25, 2003

(12) United States Patent
Pasternak et al.

(54) WIRELESS ATM NETWORK WITH HIGH QUALITY OF SERVICE SCHEDULING

(75) Inventors: Eliezer Pasternak, Palo Alto, CA (US); Itai Aaronson, Burlingame, CA (US); Gideon Ben-Efraim, Cupertino, CA (US)

(73) Assignee: Netro Corporation, San Jose, CA (US)

( * ) Notice: Subject to any disclaimer, the term of this patent is extended or adjusted under 35 U.S.C. 154(b) by 0 days.

(21) Appl. No.: 09/637,822

(22) Filed: Aug. 11, 2000

Related U.S. Application Data

(62) Division of application No. 08/956,256, filed on Oct. 22, 1997, now Pat. No. 6,157,614.

(51) Int. Cl.[7] .................................................. H04J 3/16
(52) U.S. Cl. .............................. 370/395.4; 370/395.2; 370/329; 370/462
(58) Field of Search ................................ 370/230, 235, 370/236, 329, 395, 352, 353, 355, 356, 442, 443, 444, 462, 468, 395.2, 395.4

(56) References Cited

U.S. PATENT DOCUMENTS

| | | | | |
|---|---|---|---|---|
| 5,390,184 A | * | 2/1995 | Morris | 370/353 |
| 5,519,689 A | | 5/1996 | Kim | 370/17 |
| 5,519,707 A | | 5/1996 | Subramanian et al. | 370/94.2 |
| 5,638,371 A | * | 6/1997 | Raychaudhuri et al. | 370/347 |
| 5,648,958 A | * | 7/1997 | Counterman | 370/458 |
| 5,729,541 A | * | 3/1998 | Hamalainen et al. | 370/337 |
| 5,838,663 A | | 11/1998 | Elwalid et al. | 370/233 |
| 5,917,822 A | * | 6/1999 | Lyles et al. | 370/395 |
| 5,966,163 A | * | 10/1999 | Lin et al. | 348/12 |
| 5,999,532 A | | 12/1999 | Terasaki | 370/395 |
| 6,009,096 A | | 12/1999 | Jasingh et al. | 370/395 |
| 6,041,056 A | | 3/2000 | Bigham et al. | 370/395 |
| 6,115,380 A | | 9/2000 | Christie et al. | 370/395 |
| 6,141,322 A | | 10/2000 | Poretsky | 370/231 |

FOREIGN PATENT DOCUMENTS

EP          0 774 848          5/1997          .......... H04L/12/56

OTHER PUBLICATIONS

Raychaudhuri, D. et al.: "WATMnet: A Prototype Wireless ATM System for Multimedia Personal Communication" IEEE Journal on Selected Areas in Communications, US, IEEE Inc. New York, vol. 15, No. 1, 1997, pp. 83–95, XP000637401, ISSN: 0733–8716.

* cited by examiner

*Primary Examiner*—Min Jung
(74) *Attorney, Agent, or Firm*—Bingham McCutchen LLP; Fabio E. Marino; Erin C. Ming

(57) ABSTRACT

Methods and systems for a wireless ATM network with high quality of service scheduling are provided. In one embodiment, a wireless ATM network with per-VC scheduling, a virtual framer for periodical, request-less scheduling, and a virtual shaper for request-based scheduling are provided.

11 Claims, 21 Drawing Sheets

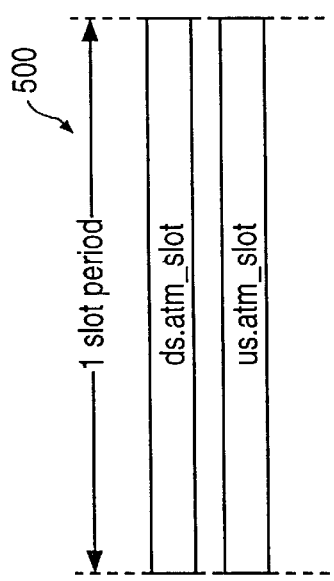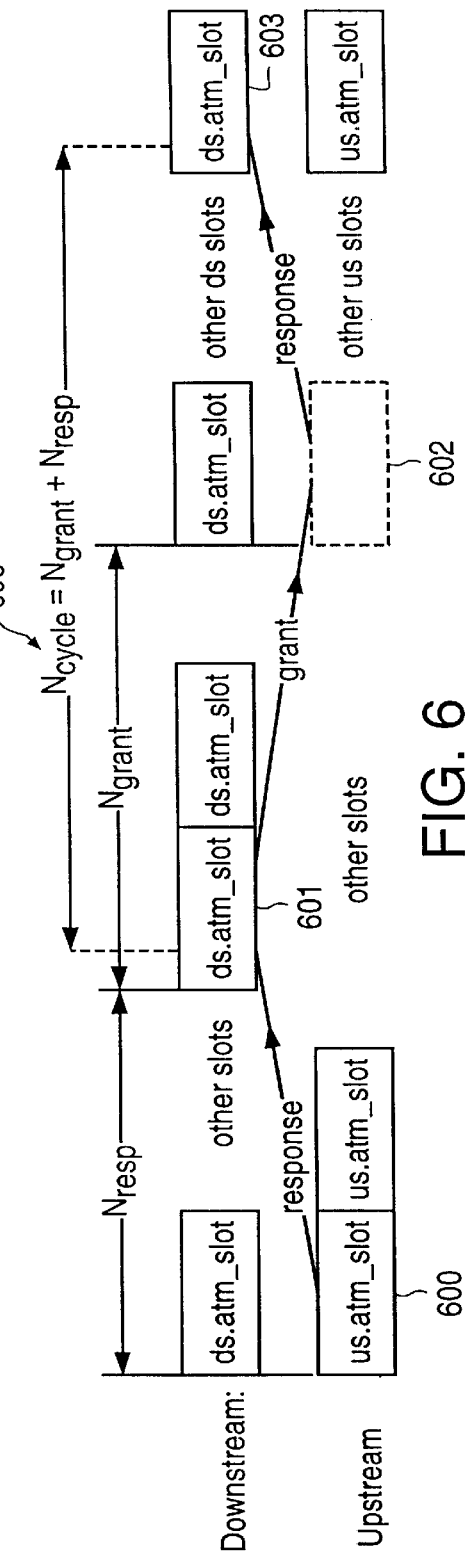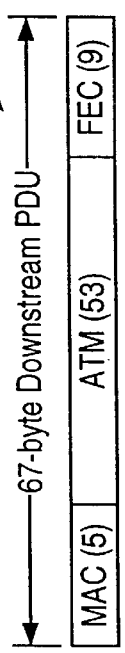

VBR Traffic Record Format

| 63 | 62:47 | 46:31 | 30:28 | 27:12 | 11:0 |
|---|---|---|---|---|---|
| lock (1) | LP (16) | RP (16) | Channel (3) | VCI (16) | VPI (12) |

| 127 | 126:125 | 124 | 123 | 122:112 | 111:100 | 99:88 | 87:76 | 75:64 |
|---|---|---|---|---|---|---|---|---|
| 0 (VBR) | BF(2) | PARK | EXPIRE | unused | I2 (12) | I1 (12) | L2 (12) | L1 (12) |

| 191:186 | 185:168 | 167:152 | 151:140 | 139:128 |
|---|---|---|---|---|
| STATIC PRIOR (6) | LCT (18) | PP (16) | X2(fl) (12) | X1(fl) (12) |

2302

CBR Traffic Record Format

| 63 | 62:47 | 46:31 | 30:28 | 27:12 | 11:0 |
|---|---|---|---|---|---|
| lock (1) | LP (16) | RP (16) | Channel (3) | VCI (16) | VPI (12) |

| 127 | 126:125 | 124 | 123 | 122:118 | 117:100 | 99:82 | 81:64 |
|---|---|---|---|---|---|---|---|
| 1 (CBR) | BF(2) | PARK | EXPIRE | unused | INCR (18) | Q(18) | REMAINDER (18) |

| 191:186 | 185:168 | 167:152 | 151:146 | 145:128 |
|---|---|---|---|---|
| STATIC PRIOR (6) | LCT (18) | PP (16) | unused (6) | leftover (18) |

```
/*    tick is a single ATM slot period.
/*    LCT = last compliant time (in slots)     */
/*    NCT = next compliant time (in slots)     */
/*    p/q = a rational number, a multiple of   */
/*          a common clock period, such as     */
/*          125µs/3                            */
/*    Increment = floor (p/q)                  */
/*    r = reminder of p/q                      */
Leftover := 0 ;
while (TRUE)
{
    if (CurrentTime > NCT )
    {
        LCT := NCT ;
        if    (Leftover + r > q)
        {
            carry := 1 ;
            Leftover := Leftover +r -q ;
        }
        else
        {
            carry := 0 ;
            Leftover = Leftover +r;
        };
    };

NCT: = LCT + Increment + carry ;
};
```

FIG. 24

```
Lock the Binary Tree;
TA := Current Time;
IF (X1 - TA + LCT > L1) {
    LCT1 := X1 + LCT - L1;
} Else {
    LCT1 := TA;
}
X1 := Max (X1 - LCT + LCT, 0) + I1;
If (X2 - TA + LCT > L2) {
    LCT2 := X2 + LCT - L2;
} Else {
    LCT2 := TA;
}
X2 := Max (X2 - LCT2 + LCT, 0) + I2;
LCT := Max (LCT1, LCT2);          // LCT is the NCT for the request
```

```
Lock the Binary Tree;
TA := Current Time;
IF (X1 - TA + LCT > 0) {
    LCT1 := X1 + LCT;
} Else {
    LCT1 := TA;
}
X1 := Max (X1 - LCT + LCT, 0) + I1;
LCT := LCT1;                      // LCT is the NCT for the request
```

WIRELESS ATM NETWORK WITH HIGH QUALITY OF SERVICE SCHEDULING

This application is a division of application Ser. No. 08/956,256, filed on Oct. 22, 1997, now U.S. Pat. No. 6,157,614.

FIELD OF THE INVENTION

This invention relates to the field of telecommunication networks and packet switching and, in particular, to medium access control protocols and transmission scheduling in shared media point to multipoint cell-switched networks.

BACKGROUND

As the concept of asynchronous transfer mode (ATM) gains wide acceptance, network designers are facing the issue known as "the last mile problem". There are cost effective ways to switch user information locally, i.e. LAN and voice switches, just as there are cost-effective ways to interconnect cities, i.e. fiber optics cables carrying synchronous digital hierarchy (SDH) traffic, which can serve as trunks for ATM switches. The "last mile" is the region between the user and the wide area network.

There are two classes of last mile access: dedicated links and shared media. Dedicated links include the copper twisted pairs (possibly with ADSL enhancement), some coax installations and point to point radios. Shared media include point to multipoint radio, coax, and some fiber optics solutions. Shared media has two main advantages: first, cost reduction at the head-end by serving many customers with a single unit; and second, the flexibility of dynamically allocating the shared capacity among the users based on instantaneous needs.

However, shared media poses several issues, such as how to maintain integrity if one user fails and floods the media with interfering signals and how to share the media fairly among the users. In particular, there is an issue of how to guarantee each user a quality of service (QoS) performance for each particular service, such as constant bit rate circuit emulation services (CBR-CES) and available bit rate (ABR).

These issues have been partially addressed by a family of techniques that include the following:

1. A base station (BS) controls the operation of the subscriber terminals (STs).
2. Transmissions on the medium can be made from the BS to STs (downstream) or from ST to the BS (upstream) but not from ST to ST.
3. The downstream transmission is a broadcast to all users, and the destination ST is specified by a media access control (MAC) address.
4. The upstream transmission is moderated by the BS, and the BS specifies which ST will transmit at each given transmission opportunity (or "slot").
5. All user-generated traffic is transmitted based on grants from the BS, and no data is transmitted in a contention slot, such as slotted ALOHA.
6. Contention slots or polling are used for bandwidth reservation.

The various techniques differ in the way they support multiple services in the upstream direction. For example, a customary technique is to define a time division multiplex (TDM) table such that each ST is allocated a few slots within the TDM table based on the user's traffic load. The TDM table includes contention slots for bandwidth requests and one-user slots for data transfer. However, the customary technique is too slow to respond to momentary bursts of traffic of specific users.

An alternative technique disclosed in application Ser. No. 08/708593 eliminates the TDM table at the ST and instead maintains the timing information at the BS for all users. In accordance with the alternative technique, the BS calculates the time intervals of CBR virtual circuits (VC) and queues a grant for each VC when its time has matured. Non-time-critical services such as ATM nrt-VBR send requests via contention slots or attached to any upstream cell MAC overhead. The requests carry a summary of the total buffer occupancy in the ST (excluding CBR), and the ST calculates an urgency figure for the buffer's status. The requests are prioritized by the BS. Once the BS decides which ST gets a grant, the grant is sent without specifying which VC within an ST can use the grant. Thus, the alternative technique provides non-directed grants.

Another example of scheduling ATM flow over a wireless network is discussed in the paper entitled "Guarantee Quality of Service Wireless Access ATM Networks" by C-S. Chang, K-C. Chen, M-Y You and J-F. Chang in IEEE J. Sel. Areas Com. Vol. 15. No. 1, January 1997, p. 106. The paper provides performance analysis of a wireless ATM network in which CBR transmission "tokens" are generated periodically and have higher priority than non-CBR traffic. Among the CBR tokens, the one selected for current transmission is the one with the highest static priority. This approach allows a bound to be calculated on the worst case delay of each VC. However, this approach lacks fairness, because a VC of similar quality objectives but lower priority will get a lower grade of service.

SUMMARY OF THE INVENTION

In accordance with the present invention, requests and grants are directed, i.e. specified per VC. Accordingly, in one embodiment of the present invention, a per-VC scheduler is provided, and MAC layer protocol formats for implementing requests and grants are also provided. A point to multipoint microwave ATM network and other shared media with mechanisms to request and grant bandwidth in the shared media are also disclosed.

In one embodiment, an ATM access network includes subscriber terminals (STs) located in several buildings in a section of a city and a base station located within a few kilometers of the STs. Each ST is connected to a plurality of user interfaces such as an ISDN basic rate interface or a 10BaseT Ethernet. The user traffic is converted to ATM traffic for upstream transmission. ATM traffic is also received from the BS and converted to the user interface format. After an ST has completed an admission process that sets the right carrier frequency, transmission power and transmission delay, the s is ready to provide ATM services.

ATM traffic flow scheduling in accordance with one embodiment of the present invention includes the following:

1. Requests and grants that include virtual circuit (VC) information, in which a VC represents a virtual path identifier/virtual channel identifier (VPI/VCI) of an ATM cell's flow.
2. A periodical request-less per VC scheduler residing at the BS, called a "virtual framer".
3. A request-based per VC scheduler residing at the BS, called a "virtual shaper".

In one embodiment, if the service of a particular VC is constant bit rate (CBR) or otherwise requires critical real time performance, then a BS scheduler called a "virtual framer" is invoked to provide periodical request less grants to the VC. Specifically, the grants specify which ST and which VC within the ST can use the grant to transmit one ATM cell, and the grants are transmitted as MAC overhead in the downstream direction.

More specifically, the virtual framer resides at the BS and includes a table of traffic records that define the source ST and the cell transmission interval. A microcontroller writes these records at the connection set up time. The microcontroller also generates a request on behalf of the ST to send one grant. The request is queued in the virtual framer, and the request is then processed. The virtual framer checks a traffic record, calculates the next compliant time (NCT), which for CBR traffic is simply the last calculated transmission time plus the cell's transmission interval. A grant is generated with the NCT as a priority descriptor. The grant enters a sorted priority queue in which it waits until the grant has "matured" (i.e., until the current time has met or exceeded the NCT). The matured grant is placed in a high priority queue of matured grants, and the matured grant is sent to the ST via the MAC overhead when it reaches the head of the line. Also, when a grant has matured, a new request is generated for the VC, and the new request is placed in the input queue of the virtual framer to keep the periodical scheduling process active. The traffic record includes the NCT variable which is compared with the current time. Because the time variable grows indefinitely, a finite binary number will overflow and indicate an earlier time than it should. A numerical roll-over technique similar to Gray coding is used so that as long as the cell transmission interval is significantly shorter than the NCT roll-over interval, no timing ambiguity will occur.

Accordingly, the virtual framer provides a scheduling mechanism that is useful for CBR traffic and real time VBR (rt-VBR) traffic. Thus, in one embodiment, rt-VBR traffic is served by the virtual framer using periodic grants, and if the ST VC has no traffic, the ST transmits idle cells.

However, some CBR traffic may include extra cells for operation and management (OAM) which are scheduled in addition to the period. In one embodiment, OAM traffic is served by a request-based mechanism which generates requests that are treated at the BS as high-priority VBR traffic using a VBR scheduling mechanism as described below.

In one embodiment, non-real-time (nrt) traffic is served by a virtual shaper. The nrt traffic is referred to below as "VBR", but the nrt traffic may correspond to any ATM class of service, including available bit rate (ABR), unspecified bit (UBR), and VBR. In an alternative embodiment, OAM cells of CBR services can use the virtual shaper as an alternative to the virtual framer, thereby trading off delay for link utilization.

In one embodiment, in "VBR" mode, an ST generates a request for each VC that has a new cell for transmission. The request may be for multiple cells of the same VC. The ST then places these requests in priority queues, which in a preferred embodiment are static priority FIFO queues. The requests wait for the next opportunity to be transmitted. The opportunity arrives when either an ATM cell from the ST is transmitted, or when a contention minislot is granted and the ST has won the right to transmit based on the contention protocol. If the request arrives without collision at the BS, the request is placed at the input queue of the virtual shaper. If more than one cell is requested, the request is broken into multiple single requests. The request at the head of the queue is processed first. The virtual shaper checks the table entry of the VC and calculates a next compliant time (NCT) based on the recent history of the VC.

However, unlike the CBR case, the traffic parameters may be quite complex, because the traffic parameters describe the rules of flow for the VC. The rules of flow for the VC are equivalent to the traffic shaping parameters used in ATM interfaces to guarantee cell timing compliance. A real shaper would keep a history of the recent cells transmitted and would delay the current cell forwarding until its timing complies is In contrast, the virtual shaper simply calculates the next compliant time (NCT) for the cell and places a grant with the NCT in a priority queue.

At this point, there are two possible approaches. The grant may be placed in a waiting queue until it matures (as described in the CBR case above), or the grant may be sent directly to a sorted priority queue. In the first approach, all grants result in a transmission that complies with the ATM traffic contract. But the first approach is a non-work-conserving scheduling discipline, because requests can be waiting while the upstream channel is idle. In the second approach, the traffic shaping is not preserved in the air interface (but it can be corrected by the traffic shaper), but the air bandwidth is utilized efficiently.

The virtual shaper may include a variety of traffic description parameters. However, a preferred embodiment uses a dual leaky bucket algorithm which is customary with VBR traffic. The ATM Forum has defined a leaky bucket operation by a protocol called "Generic Cell Rate Algorithm" or GCRA(t1,t2), described in UNI 3.1. Thus, in one embodiment, the virtual shaper emulates two leaky buckets, one with GCRA(1/PCR,CDV), PCR representing peak cell rate and CDV representing cell delay variation, and one with GCRA(1/SCR,BT), SCR representing sustained cell rate and BT representing Burst Tolerance. A real shaper maintains leaky bucket parameters (depth of the bucket and last compliant time) for each of the two buckets, the next compliant time for a new cell based on both buckets, and delay the cell until the NCT. In contrast, the virtual bucket similarly calculates the NCT of a request but then queues the request in the maturing or sorted priority queue.

In the work-conserving mode, the NCT value becomes a fairness guarantee parameter. In particular, if multiple VCs request bandwidth in excess of their traffic contract, the VCs will get the requested bandwidth, but the NCT values will interleave grants for VCs with similar traffic parameters and defer grants for VCs with lower speed. For example, if a first VC has an SCR of 10 cells/sec, a second VC has an SCR of 100 cells/sec, and for both BT=0, then the NCT values of the first VC are 0, 0.1, 0.2, . . . , and the NCT values of the second VC are 0, 0.01, 0.02, . . . . As a result, when the VCs are sorted by the earliest NCT, each VC will get one grant, and then the second VC will get about nine more grants before the first VC gets an additional grant. Accordingly, the above example illustrates an approximate weighted fair queuing (WFQ) discipline in which excess bandwidth is allocated among users based on the relative speeds allocated to each user. Thus, the virtual shaper provides a fair allocation of excess bandwidth.

In one embodiment, the NCT value can be a limited-size binary word (e.g., 18-bit) to which more bits can be added on the most significant side as a static priority. The static priority value is fixed for a given VC and does not vary when the NCT value is updated. Accordingly, a sorted priority can be grouped into static priority subclasses. Also, OAM cells of CBR traffic may be allocated the lowest static priority value (i.e. the highest priority) and thus served first.

Because VBR traffic can have long periods of non-activity, the time overflow mechanism mentioned above is insufficient. Accordingly, a refresh mechanism is provided in which all VBR traffic records are scanned periodically, and a time mark is stamped by setting a first bit. If in a second visit the first bit has not been cleared, then a second bit is set. For every request, the scheduler checks the first and second bits in the VC traffic record. If the first and second bits are both set, then the NCT is set to the current time, and the leaky buckets are cleared. The first and second bits are cleared for each request of the VC.

The present invention is better understood in consideration of the detailed description below and the accompanying drawings.

BRIEF DESCRIPTION OF THE DRAWINGS

FIG. 5 shows the timing relationship between upstream and downstream time slots in the base station for a balanced bandwidth transmission in accordance with one embodiment of the present invention.

FIG. 6 shows the timing relationship between multiple upstream and downstream time slots, establishing the correspondence between grants and responses without a need for a multislot frame in accordance with one embodiment of the present invention.

FIG. 7 shows the structure of a downstream slot in accordance with one embodiment of the present invention.

FIG. 23 shows VBR and CBR traffic records for the BS grants scheduler of FIG. 20.

FIG. 24 provides one embodiment of an approach for calculating a timing interval for the virtual framer of FIG. 21.

FIG. 27 provides steps for implementing a dual-leaky bucket algorithm for next compliant time (NCT) calculation in accordance with one embodiment of the present invention.

FIG. 28 provides steps for implementing the single-leaky bucket algorithm for NCT calculation in accordance with another embodiment that results in an approximate weighted fair queuing (WFQ).

DETAILED DESCRIPTION

Glossary of Terms

Figure 1:
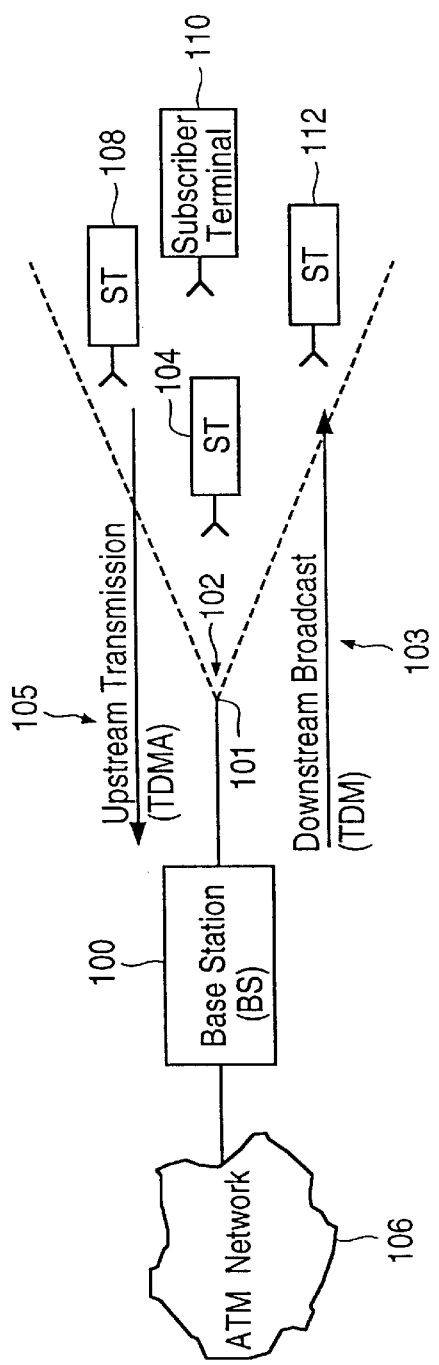
FIG. 1 shows the topology of a wireless point to multipoint network of a type suitable for use in a city in accordance with one embodiment of the present invention.

| | |
|---|---|
| AAL | ATM Adaptation Layer |
| ABR | Available Bit Rate, an ATM service in which the source rate may change during a connection, wherein cell delay variation is not specified |
| AGC | Automatic Gain Control |
| ARQ | Automatic Retransmit Request |
| ASIC | Application-Specific Integrated Circuit |
| ATM | Asynchronous Transfer Mode |
| BCH | Bose Chaudhuri Hocuqnghem, an error-correcting code |
| BMU | Base Modem Unit |
| BPSK | Bipolar Phase Shift Keying |
| BRU | Base station Radio Unit |
| BS | Base Station |
| BSC | Base station Sector Controller |
| BT | Burst Tolerance |
| CA | Cable Adapter |
| CBR | Constant Bit Rate, an ATM service with guaranteed rate of transport and cell delay variation, also used below to describe an ATM flow that can operate with periodical grants |
| CellMAC ™ | A trademark for the MAC layer in accordance with the present invention |
| CDV | Cell (ATM) Delay Variation |
| CLP | Cell Loss Priority |
| DC | Direct Current |

-continued

| | |
|---|---|
| DRAM | Dynamic Random Access Memory |
| E1 | European digital line interface at 2.048 Mbps |
| E3 | European digital line interface at 34.368 Mbps |
| EPROM | Erasable Programmable Read-Only Memory |
| EEPROM | Electrically-Erasable Programmable Read-Only Memory |
| FDD | Frequency Division Duplex |
| FPGA | Field Programmable Gate Array |
| FEC | Forward Error Correction |
| FIFO | First In First Out |
| GCRA | Generic Cell Rate Algorithm |
| HEC | Header Error Control |
| HFC | Hybrid Fiber Coax |
| ID | Identification |
| IF | Intermediate Frequency |
| IP | Internet Protocol |
| ISDN | Integrated Services Digital Network |
| LAN | Local Area Network |
| LCT | Last Compliant Time |
| LED | Light Emitting Diode |
| LLC | Link Layer Control |
| LNA | Low Noise Amplifier |
| MAC | Media Access Control |
| Mbps | Mega bits per second |
| NCT | Next Compliant Time |
| NMS | Network Management System |
| OAM | Operation And Management |
| PMP | Point to Multipoint |
| PDU | Protocol Data Unit, the payload field of a protocol packet |
| PHY | PHYsical layer |
| PN | Pseudo Noise |
| POP | Point Of Presence |
| PROM | Programmable Read-Only Memory |
| QAM | Quaternary Amplitude Modulation |
| QoS | Quality of Service, a QoS queue includes a set of queues with different priority levels |
| QPSK | Quaternary Phase Shift Keying |
| RISC | Reduced Instruction Set Computer |
| RU | Radio Unit |
| SAP | Service Access Point |
| SAPI | Service Access Point Identifier |
| SAR | Segmentation and Reassembly |
| SAS | Subscriber Access System, an indoor portion of a subscriber terminal |
| SCR | Sustainable Cell Rate |
| SNMP | Simple Network Management Protocol |
| SRU | Subscriber Radio Unit |
| ST | Subscriber Terminal (SRU + SAS) |
| STI | Subscriber Terminal Identifier |
| STM | Synchronous Transfer Mode |
| TA | Time of Arrival, also used below to describe current time |
| TDD | Time Division Duplex, transmission and reception at the same frequency alternating in time |
| TDM | Time Division Multiplex |
| TDMA | Time Division Multiple Access |
| Terminal | A system including an SAS, SRU, and appropriate interconnections |
| UART | Universal Asynchronous Receiver Transmitter |
| UBR | Unspecified Bit Rate, an ATM service with no guaranteed rate, cell loss ratio, or delay |
| VBR | Variable Bit Rate, an ATM service, also used below to describe any ATM service that must request grants for upstream transmission |
| VC | Virtual Circuit, which represents a virtual path identifier/virtual channel identifier (VPI/VCI) of an ATM cell's flow |
| VPI/VCI | Virtual Path Identifier/Virtual Channel Identifier, an ATM address |

A wireless ATM access network allows users, such as business and residential customers, to obtain a variety of telecommunication services from a service provider. The variety of telecommunication services include telephony, Internet access, LAN emulation, basic rate ISDN, or native ATM. User traffic is converted to ATM cells which are then transmitted over a wireless link.

FIG. 1 shows the topology of a wireless point to multipoint network of a type suitable for use in a city in accordance with one embodiment of the present invention. In particular, FIG. 1 shows the main building blocks of a wireless ATM access network. A base station (BS) 100 transmits and receives with an antenna in an angular sector 102. The transmission direction is shown as a downstream broadcast 103. Several subscriber terminals (ST) 104, 108, 110, and 112 receive the downstream broadcast. Based on signals from the downstream broadcast 103, the STs transmit information or other signals in the transmission direction shown as an upstream broadcast 105. The wireless ATM access network connects the users to an ATM network 106. The ATM network 106 includes ATM switches and transmission facilities, and may connect to another wireless access network, a central office switch, Internet routers, or any other network.

Figure 2:
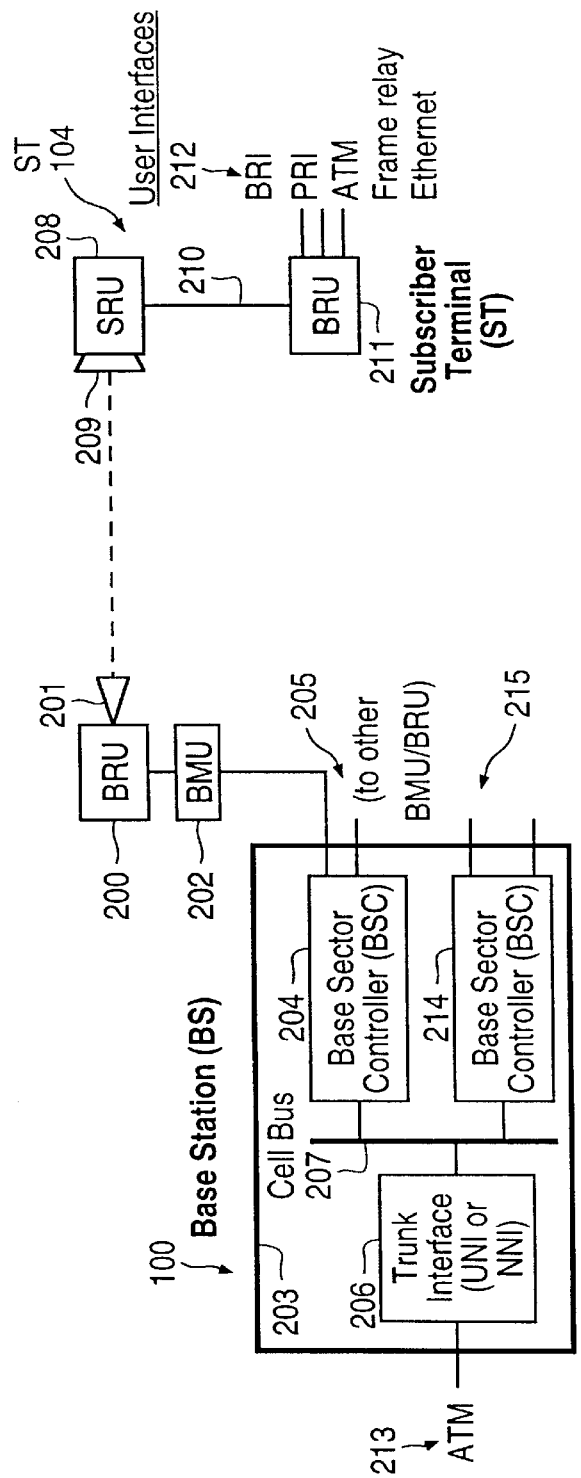
FIG. 2 shows the wireless base station and subscriber terminal of FIG. 1 in greater detail.

FIG. 2 shows the wireless base station 100 and subscriber terminal 104 of FIG. 1 in greater detail. The BS 100 includes a base radio unit (BRU) 200 with an integral or separate sector antenna 201, a base modem unit (BMU) 202, and a base station shelf 203. The base station shelf 203 includes multiple base sector controllers (BSCs) 204 and 214. Each BSC has multiple ports 205 and 215, each port serving one BRU. The BSCs control the operation of the sector 102 (FIG. 1) and all STs 104, 108, 110 and 112 (FIG. 1) that are tuned to the carrier frequency of the attached BRU 200. The BSCs perform all ATM traffic control and the scheduling of transmissions in the sector. Traffic to and from the BSCs 204 and 214 is switched or multiplexed in the shelf backplane based on an ATM switching bus or cell bus 207. One or more trunk interface units 206 connect the base station shelf 203 with the ATM network 106 (FIG. 1) using wide band link 213 such as 155 Mbit/s fiber optics or digital radio.

The ST 104 includes subscriber radio unit (SRU) 208 with integral or separate narrow beam antenna 209, connected via a coax 210 to a subscriber access system (SAS) 211 with a variety of local user interfaces 212.

The BSCs 204 and 214 in the BS 100 control and arbitrate the flow within the sector 102 (FIG. 1) by a media access control (MAC) layer protocol, which is suitable to other forms of shared media, not just wireless.

Figure 3:
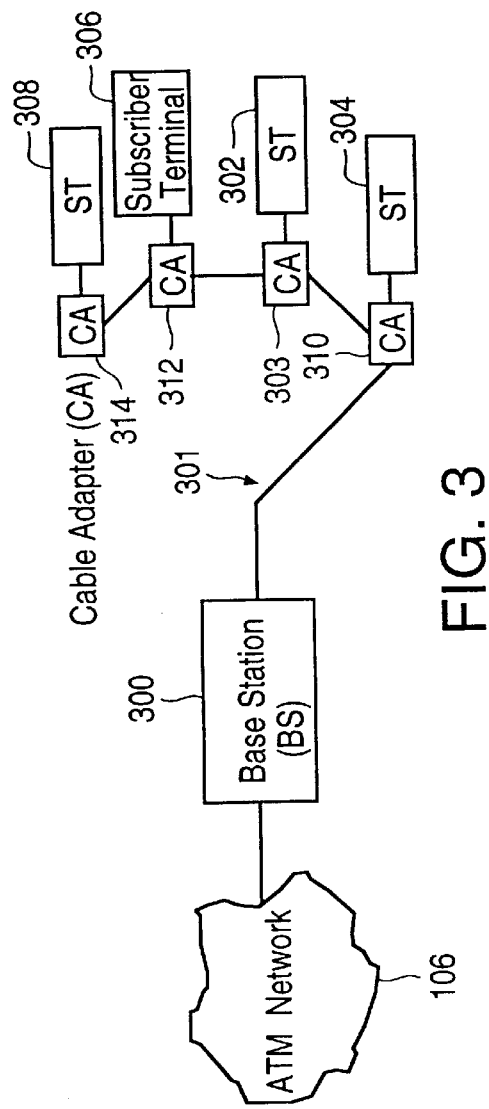
FIG. 3 shows the topology of a cable-based point to multipoint network in accordance with one embodiment of the present invention.

FIG. 3 shows the topology of a cable-based point to multipoint network in accordance with one embodiment of the present invention. BS 300 is driving and receiving from the medium 301. STs 302, 304, 306, and 308 are attached to cable adapters (CA) 303, 310, 312 and 314, respectively. The STs may be identical to the SAS 211 (FIG. 2) where the CA 303 replaces the SRU 208 (FIG. 2), or the STs may have a different physical layer implementation than the SAS 211. For example, an embodiment with an identical SAS 211 is discussed below with respect to FIG. 4. In particular, if the SAS 211 transmits in the upstream direction at 350 MHz IF frequency and receives downstream traffic at 140 MHz, the CA 303 can be implemented according to one embodiment as shown in FIG. 4.

Figure 4:
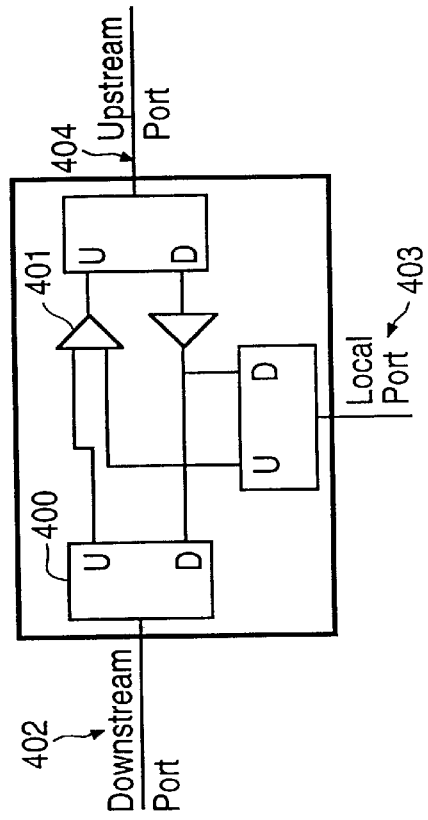
FIG. 4 is a block diagram of a 3-way bridge for the cable-based shared media of FIG. 3.

FIG. 4 is a block diagram of a 3-way bridge for the cable-based shared media of FIG. 3. A diplexer 400 separates the upstream (U) and downstream (D) frequencies. A summing amplifier 401 collects traffic from a downstream port 402 and a local port 403, where the local ST 302 (FIG. 3) is connected. The traffic goes to an upstream port 404. The CAs 303, 310, 312, and 314 (FIG. 3) are daisy chained so that the upstream port points towards the BS direction, and so that the upstream port is attached to the downstream port of a CA that is closer to the BS. By changing the CA structure, other shared media topologies are possible, such as a tree structure. In all of these shared media alternatives (wireless included), the BS broadcasts messages to all of the STs, and the STs transmit bursts of information in a coordinated manner based on a CellMAC protocol which is described below with respect to FIG. 5.

FIG. 5 shows the timing relationship between upstream and downstream time slots in the base station for a balanced bandwidth transmission in accordance with one embodiment of the present invention. In particular, FIG. 5 shows the simple relationship 500 between the downstream and upstream slots as defined by the MAC or "CellMAC" protocol. "Slot Period" or simply "Slot" is the time it takes to transmit a single ATM cell with all of the overhead (MAC, FEC and more, as discussed below). In a preferred embodiment, there is a one-to-one correspondence between the upstream slots and downstream slots. If desired, an asymmetrical arrangement is also possible, in which K downstream slots fit in one upstream slot, where K may not be an integer, as long as each upstream slot has a corresponding MAC overhead in one of the downstream slots. However, the symmetrical case is presented below without a loss of generality.

The upstream and downstream slots are aligned in time at a reference point, usually selected to be the modem in the BMU 202 (FIG. 2). The timing does not appear to be aligned at the STs due to a propagation delay. Thus, each ST adjusts its upstream slot start time to be in sync at the BMU 202. The downstream slots are always used, but the upstream slots are bursts of data or signaling from STs that are active only if the STs need to send data.

FIG. 6 shows the timing relationship between multiple upstream and downstream time slots, establishing the correspondence between grants and responses without a need for a multislot frame in accordance with one embodiment of the present invention. In particular, FIG. 6 shows a relationship between an ATM upstream slot 600 and an ATM downstream slot 601 containing a response from the BS in the MAC overhead. The response includes a collision indication (if any) and delay/power adjustments. Similarly, the timing relationship between a grant in the downstream slot 601 and the arrival of an upstream slot 602 caused by the grant is shown in FIG. 6. Overall, an Ncycle 606 defines the timing relationship between the grant in the downstream slot 601 and the response in a downstream slot 603 to the transmission caused by the grant.

FIG. 7 shows the structure of a downstream slot in accordance with one embodiment of the present invention. In particular, FIG. 7 shows a downstream transmission slot 700 which includes a MAC overhead, ATM cell (or idle cell if there is nothing to transmit) and FEC check bits. The downstream transmission, called "MAC Protocol Data Unit "(PDU)", is scrambled, the ATM cell payload block (last 48 bytes) is optionally encrypted, and the resulting message is modulated. Standard modulation techniques may be used, such as 4-QAM, 16-QAM and 64-QAM, with a 2, 4 or 6 bits symbol. In the downstream direction, the start of a slot does not need to correspond to the start of a symbol in the 6-bit/symbol case.

Figure 8:
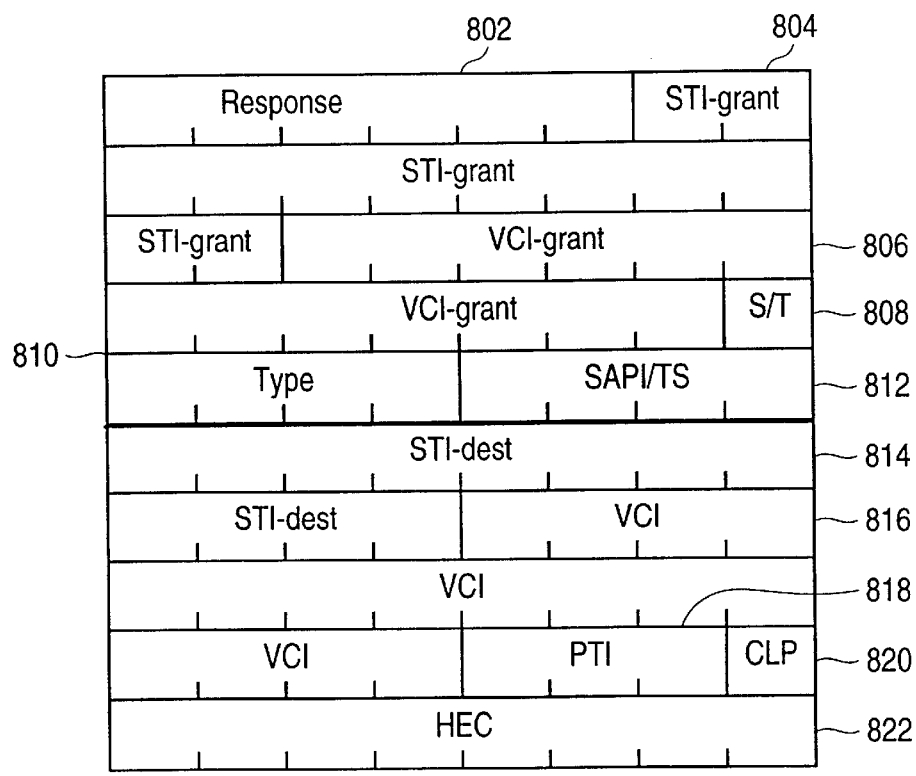
FIG. 8 shows the structure of a MAC overhead and ATM cell header in the downstream slot of FIG. 7.

FIG. 8 shows the structure of a MAC overhead and ATM cell header in the downstream slot of FIG. 7. Response 802 includes bits indicating delay adjustment (2 bits), transmit power adjustment (2 bits) and collision (1 bit). If the response is for a 6-minislot structure (discussed below with respect to FIG. 11), the 6-bits represent a collision indication for each minislot. A grant of one upstream transmission is a combination of STI-grant 804, VCI-Grant 806, and Type 810 fields. STI-grant 804 specifies the MAC address (i.e., ST identification) of a grant recipient. VCI-grant 806 is the virtual circuit identifier of the grant recipient. SIT 808 indicates whether the following SAPI/TS field 812 is SAPI or TS as described below. "Type" indicates the grant type: periodic ARM cell (i.e., an automatic ATM grant that does not require a request), aperiodic ATM cell (i.e., an ATM grant that requires a request), contention (i.e., a minislot), admit, admit follower (no op after Admit as a guard band) and no-op. SAPI/TS 812 is a combined field. For traffic with no real time limitation, SAPI/TS 812 represents a Service Access Point Identifier (SAPI), and for CBR-type, SAPI/TS 812 represents a time stamp (TS) identifying the downstream cell delay (in slots) due to air interface queuing delay. Thus, SAPI/TS 812 includes two unrelated fields that share the same space to save bits. STI-dest 814 indicates the ST destination of the ATM cell. VCI 816, PTI 818, CLP 820, and HEC 822 represent standard fields in a typical ATM cell. In particular, the header error control (HEC) 822 is an error detection/correction octet applied over the last 5 bytes of the ATM cell header. Thus, the MAC overhead and ATM cell header as shown in FIG. 8 provide as a basis for downstream cell delineation, a well known ATM technique, which is also used for synchronization of the downstream slot structure.

Figure 9:
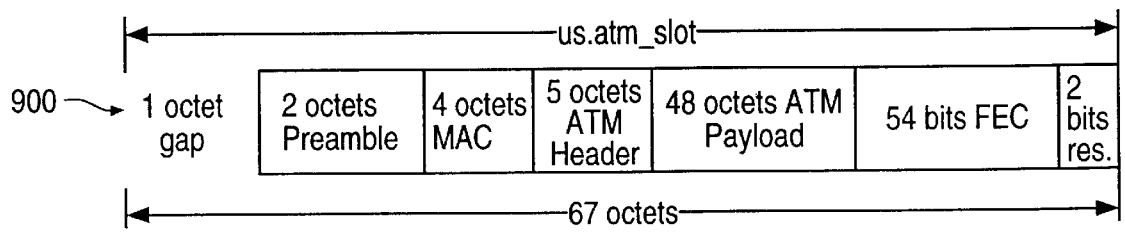
FIG. 9 shows the structure of an upstream slot when an ATM cell is transmitted in accordance with one embodiment of the present invention.

FIG. 9 shows the structure of an upstream slot 900 when an ATM cell is transmitted in accordance with one embodiment of the present invention. In particular, FIG. 9 shows a slot period of 67 octets that includes the following: a one octet gap, as a guard band against timing errors and rise/fall time of each burst; a preamble for modem synchronization, usually a BPSK fixed pattern; a 4-octet MAC overhead, as discussed below; and an ATM cell. The ATM cell includes a 5-byte header, 54 FEC bits (BCH code) spanning the MAC overhead and ATM cell header, and 2 reserved bits for rounding the octet number.

Figure 10:
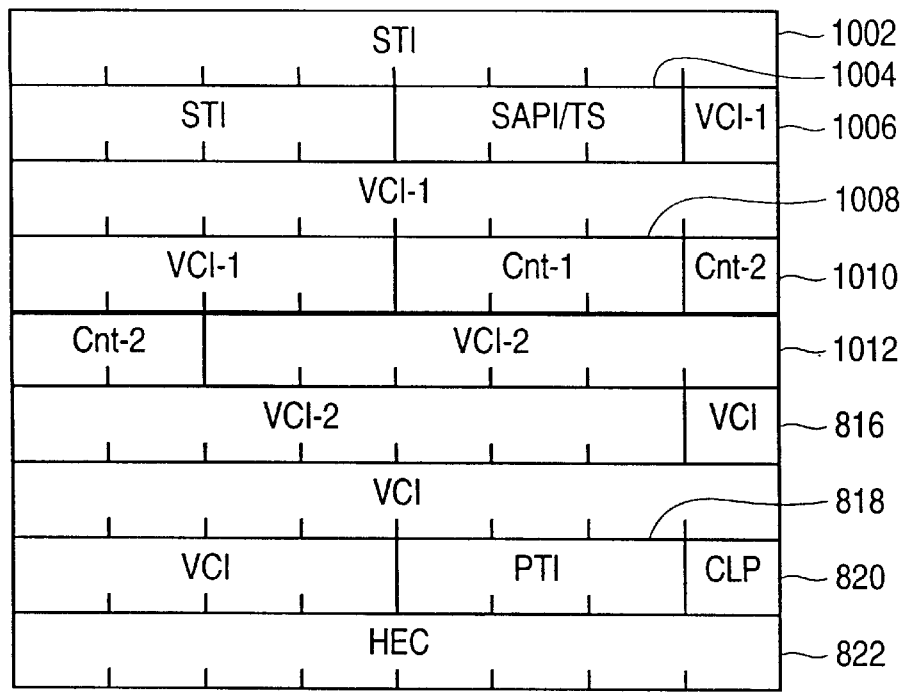
FIG. 10 shows the structure of the MAC overhead and ATM cell header in the upstream slot of FIG. 9.

FIG. 10 shows the structure of the MAC overhead and ATM cell header in the upstream slot of FIG. 9. STI 1002 represents the sender's subscriber terminal identifier. SAPI/TS 1004 is similar to SAPI/TS 812 (FIG. 8) except that no S/T bit (reference numeral 808 of FIG. 8) is provided. The following fields are provided for two requests. The first request includes VCI-1 1006, which provides the virtual circuit identifier of the requesting virtual circuit, and Cnt-1 1008, which provides the number of grants requested (e.g., 0–7, "0" representing no request). The second request includes Cnt-2 1016 and VCI-2 1012. The first and second requests may come from two different VCs in the ST, or the first and second requests may come from the same VC in the ST.

Figure 11:
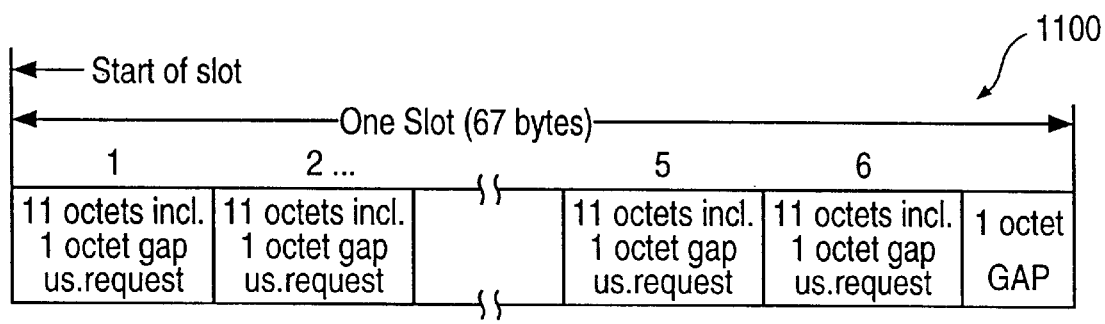
FIG. 11 shows the structure of an upstream slot that is divided into six minislots and providing six request packets sent from six different STs in accordance with one embodiment of the present invention.

A grant type may also be a contention slot. FIG. 11 shows the structure of an upstream slot 1100 that is divided into six minislots and providing six request packets sent from six different STs in accordance with one embodiment of the present invention. In particular, FIG. 11 shows a contention slot that includes 6 minislots. Each minislot includes an optional transmission from a ST. Each minislot is 11 octets wide. Each minislot may be accessed (with a potential for collisions) by multiple STs. Also, a stabilization protocol based on collision indications, such as the well known msSTART3 may be used.

Figure 12:
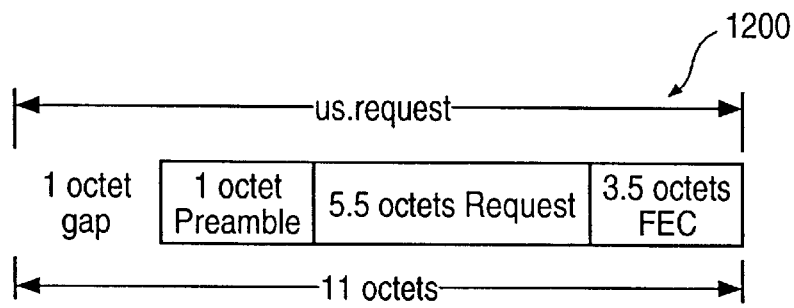
FIG. 12 shows the structure of a minislot in accordance with one embodiment of the present invention.
Figure 13:
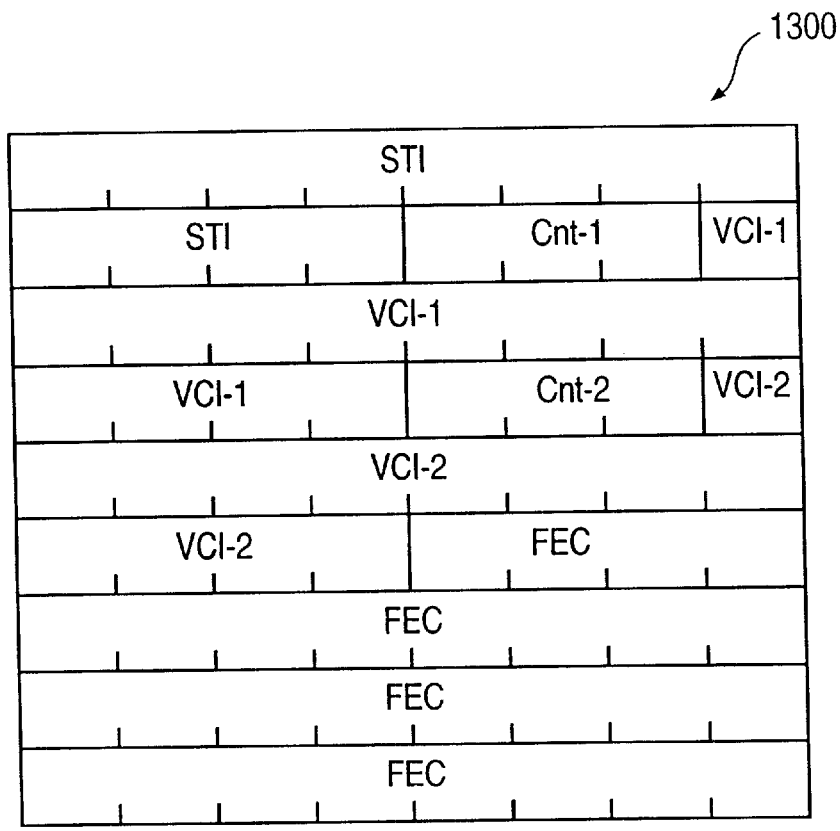
FIG. 13 shows the structure of the minislot of FIG. 12 in greater detail.

The structure of a minislot in accordance with one embodiment of the present invention is shown in FIG. 12, and the structure of a minislot 1200 of FIG. 12 is shown in greater detail in FIG. 13. In particular, FIG. 13 shows a minislot 1300 that includes two optional requests, identical in bit-field types to the two requests discussed above with respect to FIG. 10, and FEC bits (BCH code). Accordingly, the minislot 1300 allows transmission of a request if no ATM cell opportunity exists.

Figure 14:
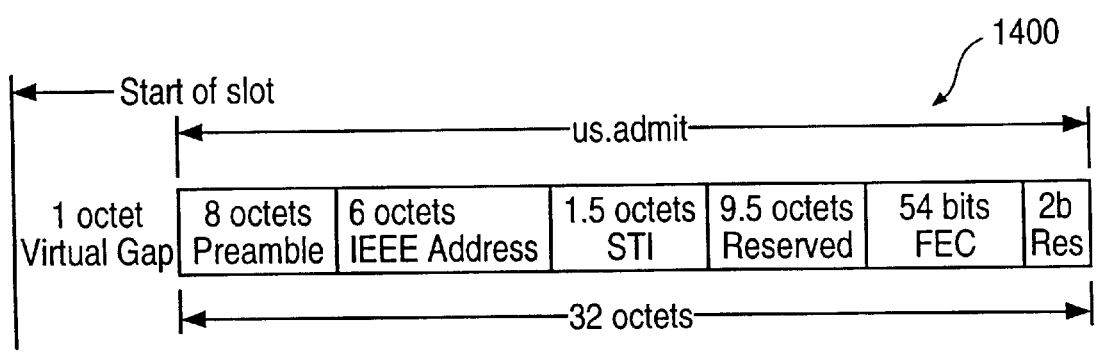
FIG. 14 shows the structure of an upstream admit slot in accordance with one embodiment of the present invention.

An Admit request represents the third type of upstream transmission coming from an ST that has not yet established close-loop control of transmit power and timing delay. FIG. 14 shows the structure of an upstream admit slot 1400 in accordance with one embodiment of the present invention. In particular, FIG. 14 shows an initial Admit transmission that includes an octet IEEE address (like Ethernet) and STI=0. This is a contention-slot where collisions may happen and retransmission is possible.

Figure 15:
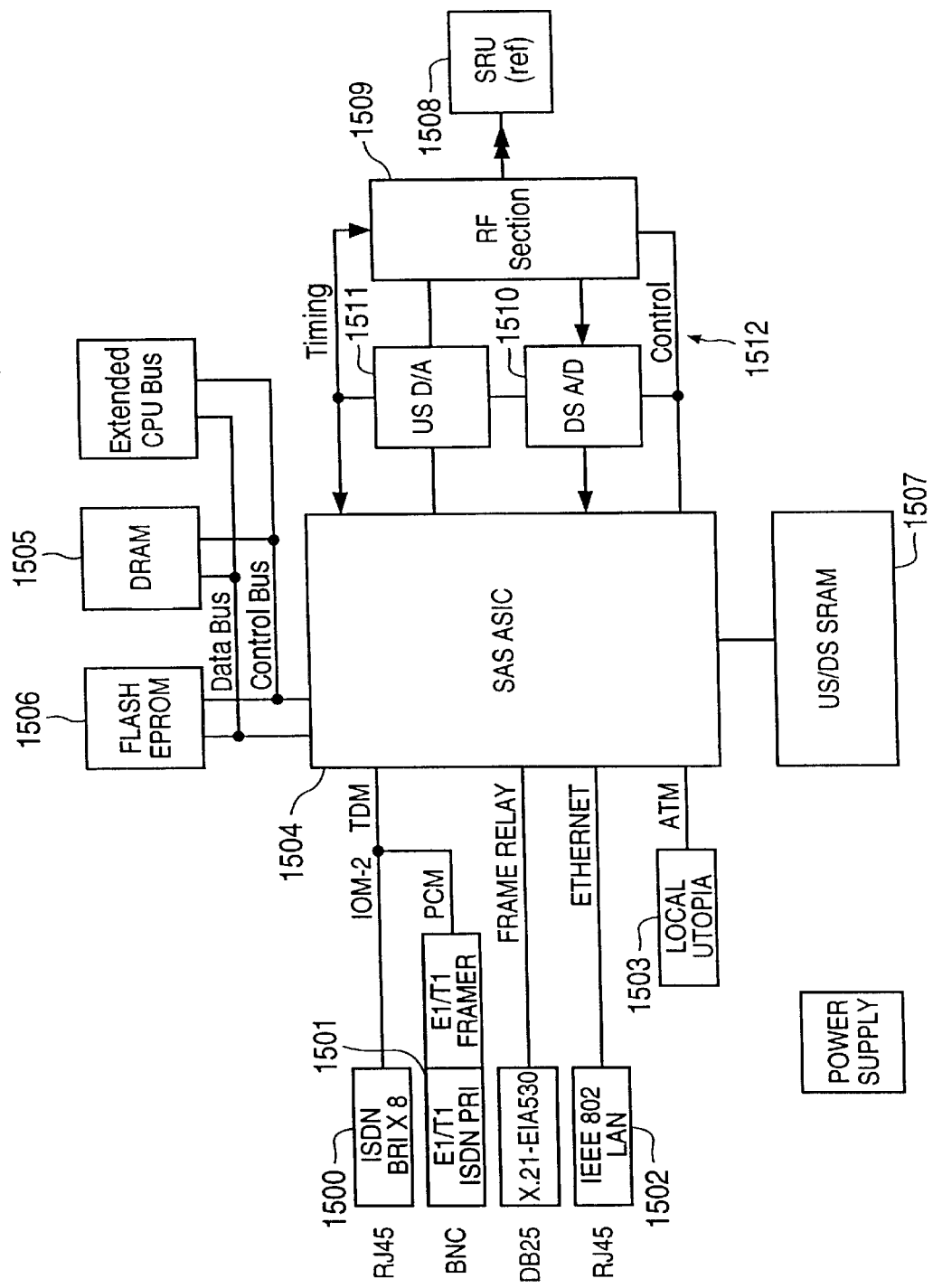
FIG. 15 is a block diagram of a subscriber access system (SAS) in accordance with one embodiment of the present invention.

FIG. 15 is a block diagram of a subscriber access system (SAS) in accordance with one embodiment of the present invention. In particular, FIG. 15 shows an SAS that includes local user interfaces, such as ISDN basic rate 1500, T1/E1 1501, or Ethernet 1502. An ATM interface is provided by a Utopia port 1503. The signals from the local user interfaces, after the typical buffering and framing as appropriate, enter a digital processing circuit, SAS ASIC 1504. In one embodiment, the SAS ASIC 1504 requires approximately 1,000,000 gates and is implemented with 0.35 micron technology which is well within current technology capabilities. The SAS ASIC 1504 uses local memory as needed and includes DRAM 1505, Flash EPROM 1506, and SRAM 1507. The downstream traffic is received as IF frequency from SRU 1508. An RF section 1509 provides gain control, conversion to 70 MHz, and IF filtering. The filtered 70 MHz signals are sampled and converted to digital by an A/D converter 1510 with a sampling rate of 56 MHz. (The sampling rate is adequate, because the IF is narrow band (few MHz)). The SAS ASIC 1504 also outputs the modulated signals in a digital form at 70 MHz, using 93.33 Msamples/sec. The signal is then converted to analog by a D/A converter 1511 and delivered to the RF section 1509, and the signal undergoes filtering for spectral shaping and conversion to 350 MHz IF frequency. The SRU will further convert this frequency to the microwave frequency, typically in the range of 10–40 GHz.

Figure 16:
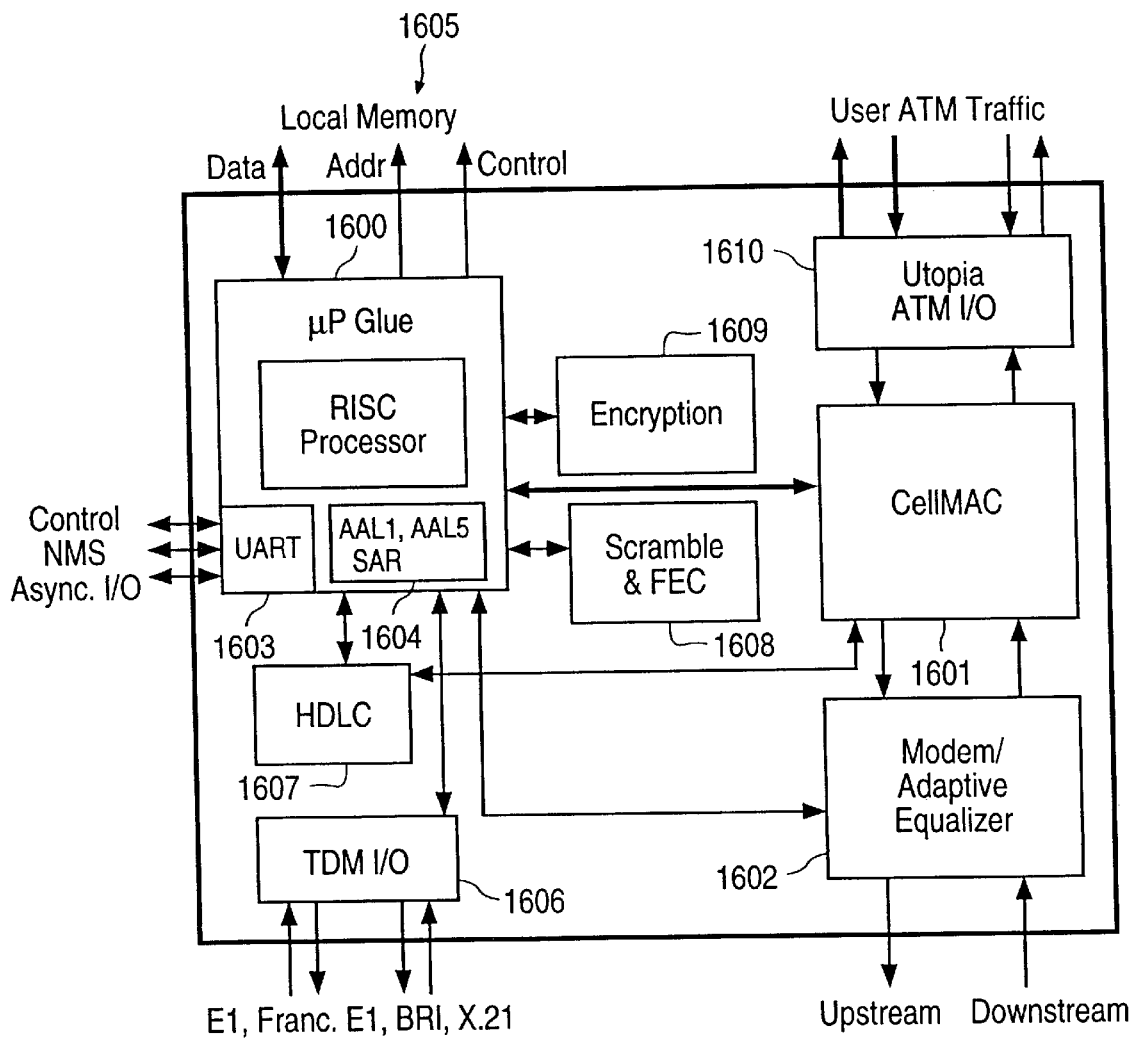
FIG. 16 is a block diagram of an SAS ASIC in accordance with one embodiment of the present invention.

FIG. 16 is a block diagram of an SAS ASIC in accordance with one embodiment of the present invention. RISC processor 1600, CellMAC Processor 1601, and modem 1602 represent the three main building blocks. The RISC processor 1600 may be an off the shelf ASIC macro, such as ARM7, a 30 MIPS 32-bit machine available as a library part from Synopsys, Inc. of Mountain View Calif. The RISC processor 1600 includes asynchronous ports (UART) 1603, used for control monitor options or user ports, and ATM segmentation and re-assembly (SAR) 1604, used for hardware assistance for both AAL1 and AAL5 protocols. SAR functions are also well known and designs available from many commercial sources (see below). The RISC processor 1600 also uses external memory devices via a "local memory" port 1605. The local memory port 1605 allows memory-mapped I/O for Ethernet and similar traffic. Synchronous traffic is provided via a TDM port 1606. Some synchronous ports may use HDLC protocol, such as the ISDN "D" channel. Thus, HDLC controller 1607 is also included.

At this point, the conversion to ATM traffic can be described. The TDM traffic can go from the TDM interface 1606 to the AAL1 SAR 1604 via a direct bus 1611, which is how ATM cells of circuit emulation services are created and received from the ATM network. If needed, TDM traffic can be buffered in an external memory such as an SRAM. ISDN "D" channel information is converted from packets at the RISC processor 1600 to HDLC flows at the HDLC converter 1607 to the TDM interface 1606. HDLC packets from the TDM/HDLC chain arrive as packets at the RISC processor 1600 and can be converted under software control to AAL5 packets by the AAL5 SAR 1604. The ATM cells are delivered to the CellMAC 1601, where the ATM cells wait for a transmission opportunity. Before transmission, the ATM cells may be encrypted by encryption 1609 and scrambled by scramble and FEC 1608, both of which are well known techniques.

Figure 19:
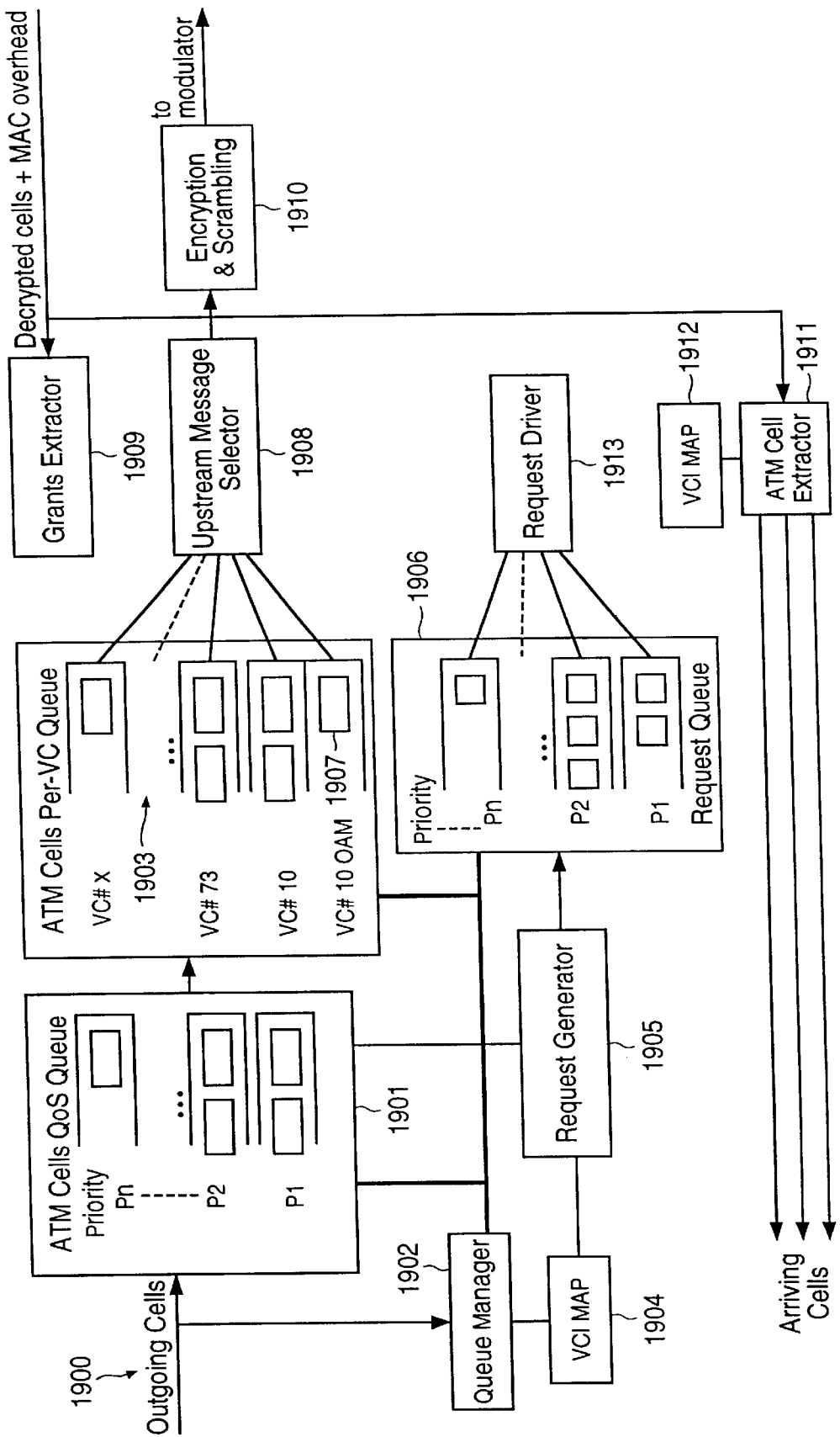
FIG. 19 shows the MAC and ATM layer activities in the SAS of FIG. 15 including request queuing and ATM cell queuing for upstream transmission.

ATM cells from the Utopia port 1610 can directly enter the CellMAC 1601. The CellMAC 1601 performs several tasks. The CellMAC 1601 receives the downstream ATM and MAC overhead (i.e., ATM cell delineation). The CellMAC 1601 descrambles using the descrambler 1608. The CellMAC 1601 decodes the response field (FIG. 8) if the CellMAC 1601 has transmitted an Ncycle before. The CellMAC 1601 reports timing and power adjustments to the RISC processor 1600 that will adjust these parameters by changing register values in the CellMAC 1601 and via a telemetry link 1512 (FIG. 15) to the SRU 1508 (FIG. 15). The CellMAC 1601 maintains a request queue 1906 (FIG. 19). The CellMAC 1601 decodes the grant fields (as explained above with respect to FIG. 8) and sends an ATM cell, Admit packet, or minislot, as permitted by the grant parameters. The CellMAC 1601 also picks up the received ATM cell if the STI field agrees with the local address or with one of several broadcast addresses stored in local registers. The CellMAC 1601 receives an indication from the FEC decoder 1608 if an uncorrectable error has occurred. The CellMAC 1601 maintains a VCI lookup table specifying what to do with each ATM cell corresponding to the VCI. The VCI table entry includes VCI (13 bit), and the output includes the following: destination (Utopia port, AAL1, AAL5 SAR 1604) drop cell or keep cell if uncorrectable error has occurred, and which encryption key to use among a set of keys stored in the Encryption 1609. The CellMAC 1601 optionally compensates the delay variation of CBR-type cells based on the time stamp field value. The CellMAC 1601 executes the msSTART instructions for minislot collision resolution. Finally, the CellMAC 1601 accepts ATM cells from the local ports (Utopia 1610, Processor 1600, SAR 1604) and transmits them when a corresponding grant arrives. The CellMAC 1601 is also discussed below with respect to FIG. 19.

The combined binary stream from the CellMAC 1601 is sent to a modem 1602. The modem 1602 includes an adaptive equalizer on the receive side for reception to correct multipath fading, and an optional phase compensation filter on the transmit path to pre-distort the outgoing phase so that the reception in the BS burst demodulator is equalized. The predistortion may be implemented by setting register values by the RISC processor 1600. The register values are found by the BS burst demodulator and are transmitted to the RISC processor 1600 using a slow messaging channel by the BS. The modem 1602 may also perform I and Q modulation/demodulation, receive carrier de-rotation, and any other modem functions which are well known in the digital signal processing modem design field. Modem software building blocks are available from Synopsys.

Figure 17:
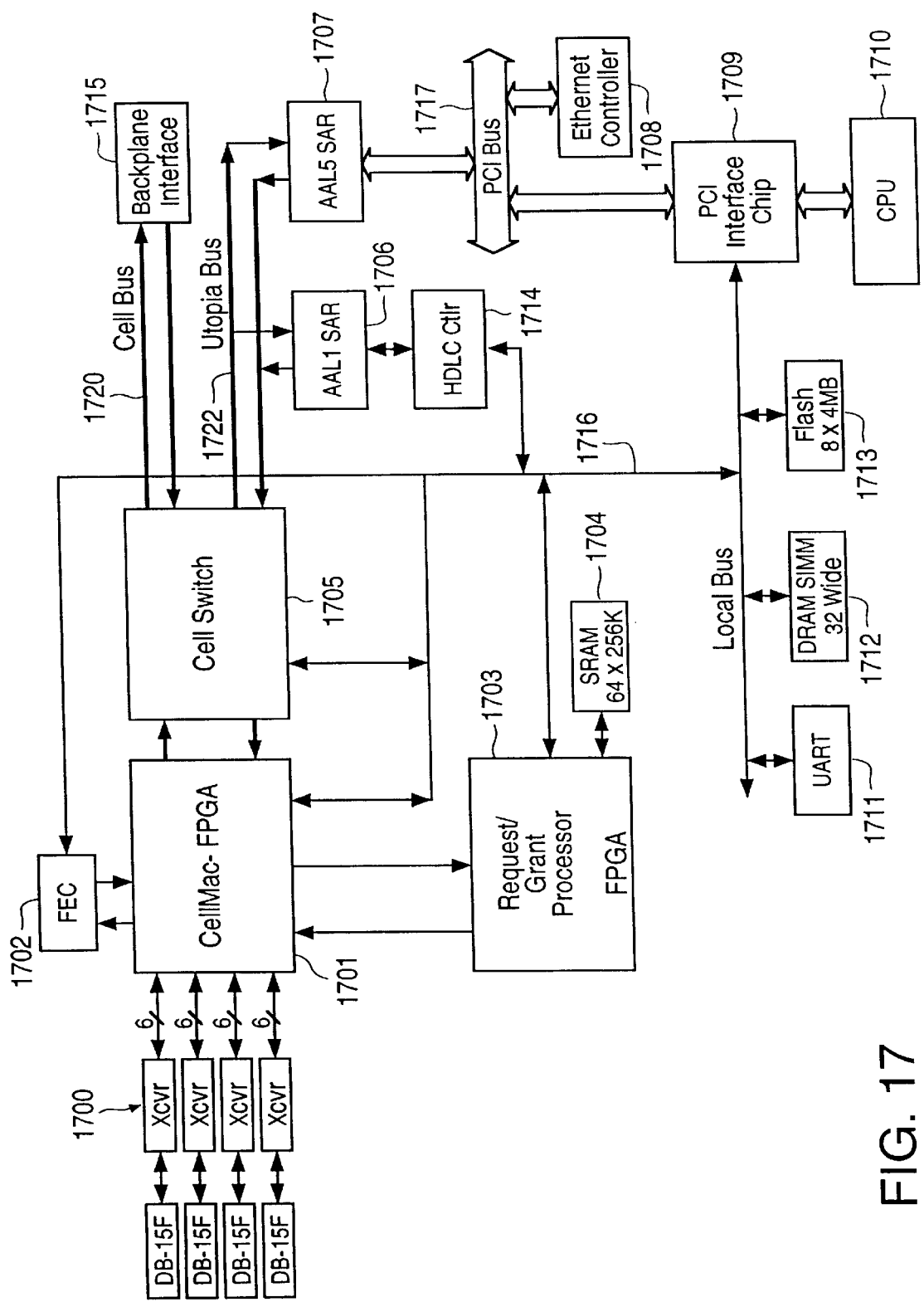
FIG. 17 is a block diagram of a base sector controller (BSC) in accordance with one embodiment of the present invention.

FIG. 17 is a block diagram of a base sector controller (BSC) in accordance with one embodiment of the present invention. In particular, FIG. 17 provides an example of four independent lines 1700 controlled by a single card where each line connects to a single modem (BMU 202 (FIG. 2) port) and a corresponding BRU 200 (FIG. 2). An FPGA 1701 or an equivalent ASIC performs CellMAC bit formatting. An external FEC device 1702 (e.g., off the shelf or FPGA) can be used. Due to the variety of BCH formats, a preferred embodiment uses an FPGA. The CellMAC FPGA 1701 performs several tasks. In particular, the CellMAC FPGA 1701 receives ATM cells from a cell switch 1705, combines grants from the grants processor 1703 and responses from the modem (received via the port 1700), optionally encrypts, scrambles and FEC encodes a downstream slot, and outputs the aggregate bit stream to the modem port 1700. The CellMAC FPGA 1701 also receives signals and indications from the modem 1602 (FIG. 16), scramble and FEC 1608 (FIG. 16), and encryption 1609 (FIG. 16). The CellMAC FPGA 1701 maintains an STI/VCI table and optionally drops cells whose errors are uncorrectable. The CellMAC FPGA 1701 extracts the request fields from the received ATM slots and minislots and delivers them to the request grants processor 1703. The CellMAC FPGA 1701 optionally compensates for delay variation of CBR cells based on the time stamp content. Finally, the CellMAC FPGA 1701 delivers the ATM cells to the cell switch 1705 and delivers the Admit content to CPU 1710. The CellMAC FPGA 1701 may use external devices, especially memory, for lookup tables.

The request/grant processor 1703 receives requests and issues grants, automatically or based on requests. In one embodiment, the request/grant processor uses a 64-bit wide SRAM 1704 with depth as required. The request/grant processor 1703 is further discussed below with respect to FIGS. 20 through 29.

Cell switch 1705 is a chip-set implementing a small ATM switch with switching, queuing, and address translation functions. Standard cell switch devices are available from IGT of Gaithersburg Md. Cell switch 1705 connects to an AAL1 SAR 1706, AAL5 SAR 1707 via a Utopia bus 1722, and BS backplane interface 1715 via cell bus 1720.

The cell bus 1720 allows connectivity to the trunk interface 206 (FIG. 2) and to a master CPU card, if any, thus creating an AAL5 VC to the CPU 1710 via the AAL5 SAR 1707, and optionally other BSC cards. The AAL1 SAR 1706 can connect to an HDLC controller 1714 which can connect to a local bus 1716. Thus, ISDN "D" channel and similar protocols can be processed.

The AAL5 SAR 1707 allows packet-based communication with remote devices over the ATM network and the air interface. A PCI bus 1717 serves the AAL5 SAR 1707, an Ethernet Controller 1708 (for configuration or NMS access), and a PCI interface device 1709. The PCI interface device 1709 serves the CPU 1710 and may be a standard PCI interface device available from Integrated Device Technology of Santa Clara, Calif. The CPU 1710 controls and configures all the devices on the board via the PCI bus 1717 and the local bus 1716. The CPU 1710 includes operating system software, such as VX Works, Network Management System (NMS) interface, user interface software, and device drivers for programmable devices on the board. The CPU 1710 can communicate with an NMS and a shelf control processor (if any) via the Ethernet controller 1708 or via an ATM virtual circuit using the AAL5 SAR 1707.

Figure 18:
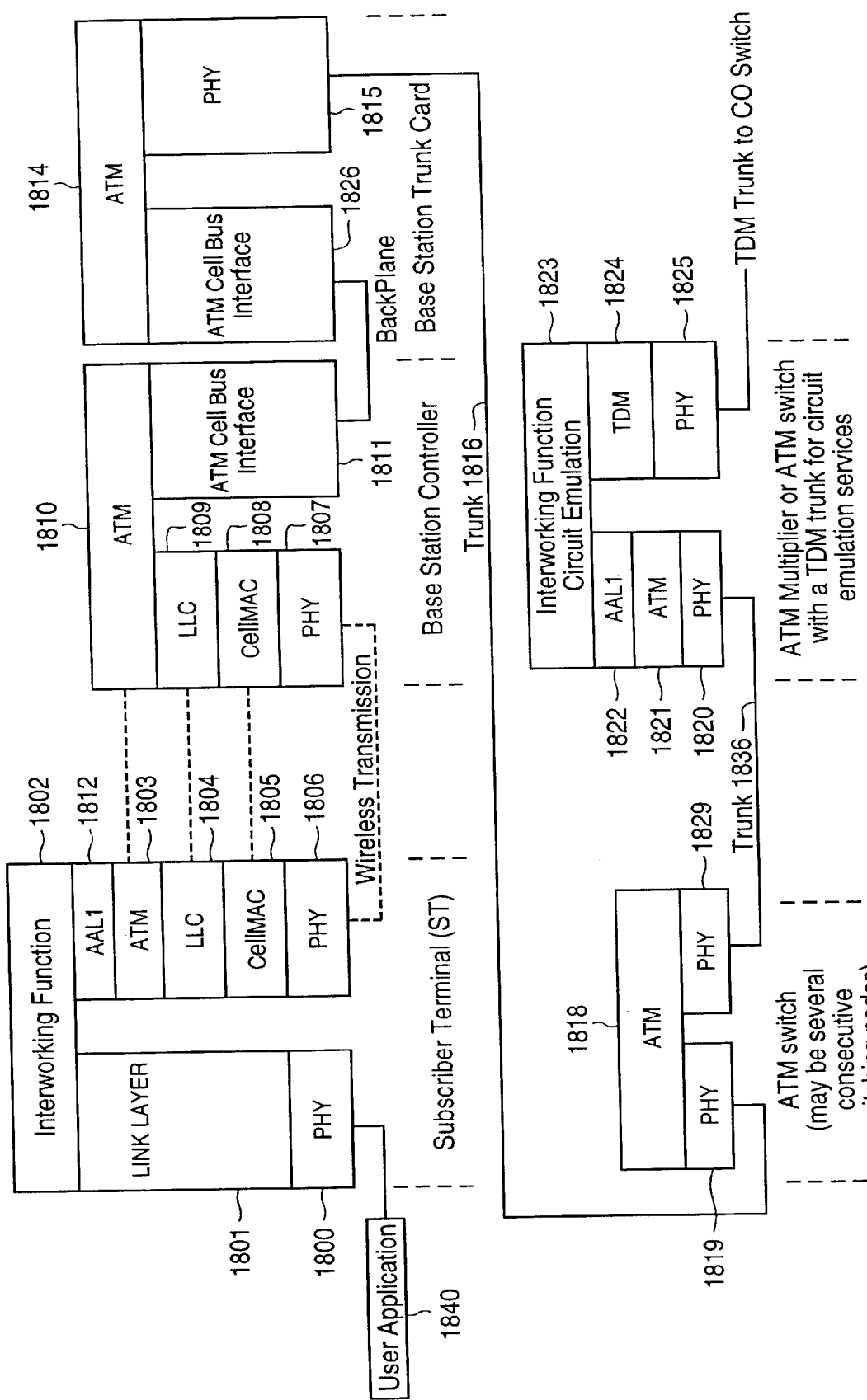
FIG. 18 is a reference model of protocol layers involved in an ATM network access in accordance with one embodiment of the present invention.

FIG. 18 is a reference model of protocol layers involved in an ATM network access in accordance with one embodiment of the present invention. In particular, FIG. 18 illustrates the processing of a user application. A user application 1840 (e.g., a telephone set or an Ethernet port) connects to the ST via a physical layer 1800. If required, the user's device performs link layer communications with the ST via a link layer 1801. An interworking function (usually a software program) 1802 converts the link layer packets to a format acceptable to a far-end device connected to the ATM network 106 (FIG. 1), such as a central office switch or a router. The packets are broken into ATM cells by a AAL1 layer 1812 (AAL1 or AAL5). An ATM layer 1803 queues the cells and requests transmission from the layer below. A link layer control (LLC) 1804 is provided if an automatic retransmit request procedure is desired. In a preferred embodiment, the LLC 1804 is bypassed. CellMAC 1805 and PHY 1806, and CellMAC 1808 and PHY 1807 perform the air transfer of ATM cells and bandwidth requests as described above. A LLC 1809 like the LLC 1804 is optional. An ATM layer 1810 receives ATM cells, queues the cells, and transfers the cells to an ATM cell bus interface 1811.

Occasionally, the ATM traffic includes special ATM cells such as Resource-Management or OAM. The special ATM cells are intercepted by the cell switch 1705 (FIG. 17) and transferred to the AAL5 SAR 1707 (FIG. 17) or the local bus 1716 (FIG. 17). The ATM cells at the cell bus are received by an ATM cell bus interface 1826 that queues the ATM cells with an ATM layer 1814 and outputs the ATM cells to a trunk 1816 via a physical interface 1815. The ATM cells may travel through several nodes of ATM switches, which may include physical interface 1819, ATM switching 1818, and connections to other trunks such as a trunk 1836.

At the other end or ends of the network, the ATM traffic may be converted back to a non-ATM format such as digital circuit emulation. For example, the user interface may be a telephone set or an ISDN terminal. The user's information is converted to digital TDM channels by the physical port 1800, and the signaling is handled by the link layer 1801. The TDM channel or channels are converted to ATM circuit emulation services by the interworking function 1802. The ATM cells with circuit emulation services arrive at a destination node and are converted back to TDM traffic.

However, the conversion, done by AAL1 SAR function 1822 and interworking function 1823 may intentionally result in a different TDM structure in a TDM framer 1824. For example, the user interface 1800 may be a 2-channel ISDN, and the destination interface 1825 may be a T1 or E1 trunk with multiple channels including traffic from multiple users. Channelized T1 or E1 line cards with ATM circuit emulation services are available from several vendors including Cisco Systems and 3-Com.

The telephony traffic also flows in the opposite direction, from the network 1825 to the user 1800 using the same protocol layers and the same network elements as described above. The operation of the ATM 1803 and the CellMAC 1805 at the SAS are further discussed with respect to FIG. 19.

Accordingly, FIG. 18 illustrates the transmission and multiplexing of multiple TDM channels over a wireless ATM network in accordance with the present invention, which may also be combined with a special handling of the signaling as further discussed below with respect to FIG. 31.

FIG. 19 shows the MAC and ATM layer activities in the SAS of FIG. 15 including request queuing and ATM cell queuing for upstream transmission. ATM cells 1900 arriving from the Utopia port 1610 (FIG. 16) or the SAR 1604 (FIG. 16) are queued in one of n static priority queues 1901 under the control of a queue manager 1902. The selection of a priority level may be performed by reading the content of a VCI map 1904 that is written by the microcontroller when a connection is set up. The VCI map 1904 also includes the service type (VBR or CBR), because only the VBR-type typically generates requests. The queue manager then transfers the cells, starting with the highest priority, to a per VC queue 1903. As these cells are being transferred, a request is generated including the VCI and number of cells. The number of cells is determined simply by checking if consecutive cells in the same QoS queue have the same VCI. As VBR traffic (i.e., traffic that requires requests) tends to flow in bursts of cells, this simple approach is sufficient, otherwise it is possible to examine the entire queue. In another embodiment, queue 1901 is implemented as a per VC queue so that the size of the queue will correspond to the size of the request.

The queue manager 1902 also examines the VCI map 1904 and the payload type PTI field of the ATM cell to determine the cell type. The cell types of interest are VBR, any cell whose air transmission is aperiodic and requires a request for a grant, CBR, any cell whose air transmission receives automatic grants without a request, and aperiodic CBR, any addition to the flow of CBR traffic, such as OAM cells which require a request.

The OAM cells of CBR flow may receive a special treatment. In one embodiment, the OAM cells of CBR flow are stored in an OAM special buffer 1907, and a request is generated and placed in the request queue 1906 at the highest priority (P1).

In another embodiment, a CBR flow may be allocated automatic grants in an amount less than the peak rate. In this embodiment, the request generator 1905 is given access to the per-VC queue 1903, examines the CBR queues, and generates requests if the queue reaches a predefined depth. The predefined depth value can be programmed in the VCI map 1904.

In response to the VBR and aperiodic cell types, the request generator 1905 issues a request that is stored in the request queue 1906. The request includes the VCI and number of cells. A request driver 1913 waits for opportunities to send requests (e.g., ATM grant or minislot). If a minislot is used, then the appropriate collision stabilizing protocol is used, as discussed above. When an opportunity to send requests arises, the request driver 1913 selects the two highest priority requests and transfers them to an upstream message selector 1908. The upstream message selector 1908 also selects the ATM cell of the grant VCI type. The grants arrive from a grant extractor 1909. The upstream message including the ATM cell and up to two requests are sent to the encryption and scrambling block 1910.

On the receive side, the CellMAC operation includes decryption, descrambling, and cell delineation, as discussed above with respect to FIG. 16. The received ATM cells are extracted by an ATM cell extractor 1911 based on the STI value and then routed to the local devices (Utopia port or SAR devices) based on a VCI map 1912.

The SAS request queuing scheme as discussed above with QoS queues may be less optimal than prioritizing each request and sorting the highest priority. However, in a preferred embodiment, the QoS queues are used for simplicity and fairness. For example, there is sufficient opportunity to send these requests with ATM cells or minislots, and in the base station, multiple requests arrive from the subscriber terminals. As a result, the scheduler must grant the request with a high degree of fairness. In another embodiment, the base station scheduler includes sorted priority queues.

Figure 20:
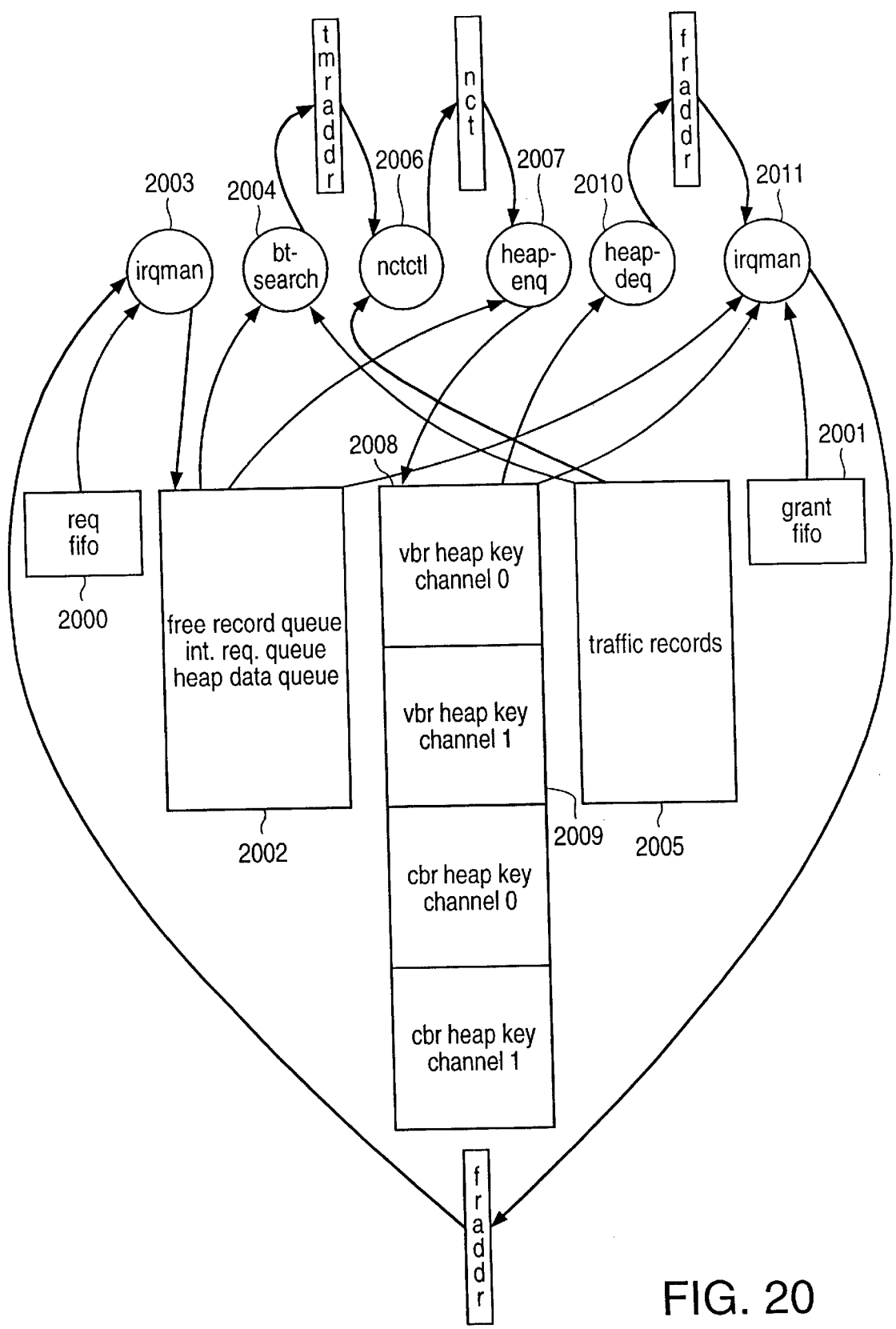
FIG. 20 is a process diagram of activities in a BS grants scheduler in accordance with one embodiment of the present invention.

FIG. 20 is a process diagram of activities in a BS grants scheduler in accordance with one embodiment of the present invention. In particular, FIG. 20 shows a pipeline of request-grant flow. Requests extracted from upstream ATM cells in MAC overhead and minislots are placed in a request FIFO 2000. Grants are given to the two channels downstream flow by a grant FIFO 2001. The requests from the request FIFO 2000 are broken into intermediate requests of a single cell and placed in an intermediate request queue 2002. Intermediate queue manager 2003 controls these activities. In one embodiment, the intermediate queue is manager 2003 and other queue managers are implemented as gate array circuits that control sections of a memory. Further, buffer manager techniques based on FIFO and balanced binary tree buffer control techniques are well known.

Binary search manager 2004 reads the requests in intermediate request queue 2002 and searches the traffic records 2005 of the VCI. In one embodiment, the traffic records 2005 are arranged in a binary tree for a fast retrieval of information. The traffic records 2005 are kept in memory 1704 (FIG. 17) and are deleted or added only during call setup or tear down. Accordingly, the binary tree can be managed by the CPU 1710 (FIG. 17) as a background task. The traffic records 2005 are also discussed below with respect to FIG. 23.

The traffic record address is given to a next compliant time (NCT) controller 2006. In one embodiment, the NCT controller 2006 is an arithmetic logic unit that is microprogrammed to read the traffic records 2005, modify the traffic records 2005, based on NCT algorithms discussed below with respect to FIGS. 21–29, and place a copy of the calculated NCT value, the associated STI/VCI and TYPE in one of several heaps (e.g., balanced binary trees) by a heap enqueue manager 2007. The STI/VCI+NCT combination is called a "grant". For channel 0, there are two heaps: VBR heap 2008 and CBR heap 2009. In one embodiment, VBR heap 2008 and CBR heap 2009 only include pointers to the real information for efficient usage of memory. The original heap information is stored in heap data queue and free record queue 2002 for used grants whose memory space is freed for new grants.

In parallel, a heap dequeue manager 2010 selects the highest priority grant based on predefined rules. "Highest priority" means "lowest priority value" (i.e., among all NCT values in a table, the smallest, or earliest, has the highest priority). If the NCT value of the highest priority CBR grant 2009 is greater or equal to the current time, it is selected. Otherwise, the highest priority VBR grant is selected.

The selected grant address is given to an intermediate queue manager 2011 which pulls the grant from the heap 2008 or 2009 and places the STI/VCI and Type field in the grant FIFO 2001. The grant is ready for delivery to the downstream flow of channel 0. The heap dequeue manager 2010 and intermediate queue manager 2011 can alternate between channels 0 and 1.

If the grant was for a CBR type, the free address of the used grant is marked by the intermediate queue manager 2011 as "reusable", and the other intermediate queue manager 2003 treats it as a new request that has just entered the intermediate queue 2002. Thus, when the CPU 1710 (FIG. 17) places a CBR request in the queue 2002, the CBR request creates a non-ending chain of grant-request pairs for the VC.

The operation of a traffic flow scheduler relies on the priority value expressed in time units, the next compliant time (NCT) calculated by the NCT controller 2006. Different techniques for calculating NCT values yield different cell flow disciplines. In particular, one technique, called a "virtual framer", represents a scheduling technique for CBR traffic type in accordance with one embodiment of the present invention.

Figure 21:
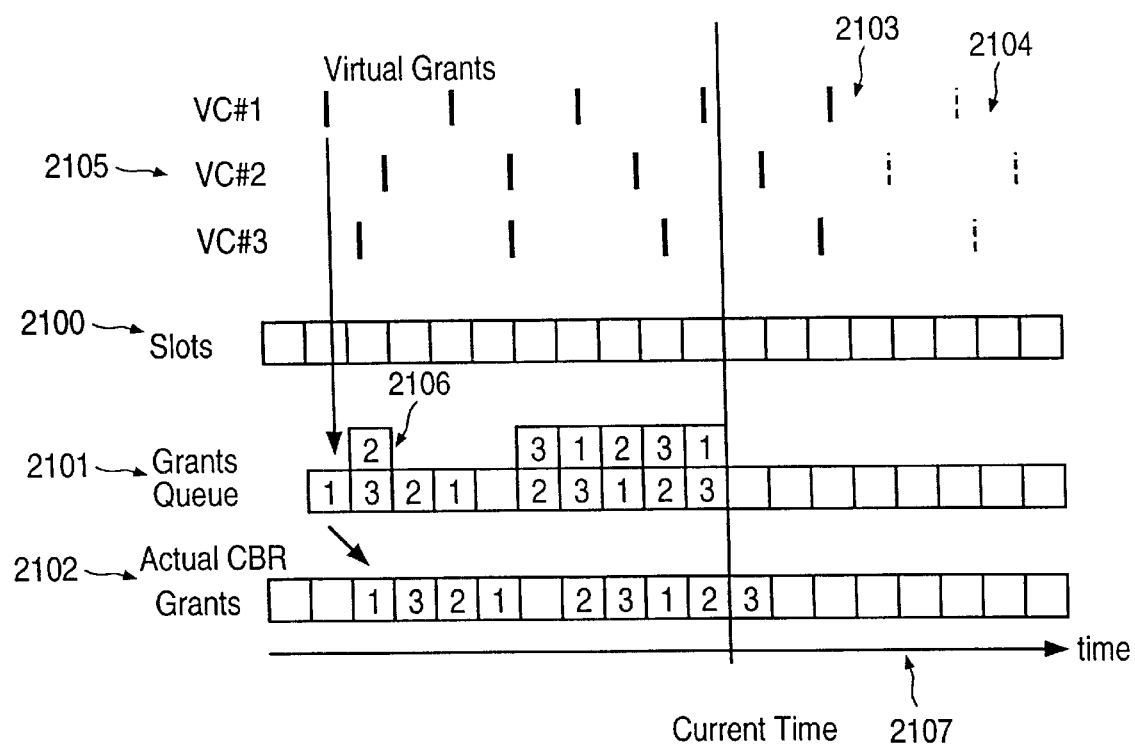
FIG. 21 shows the operation of a virtual framer in accordance with one embodiment of the present invention.

FIG. 21 shows the operation of the virtual framer in accordance with one embodiment of the present invention.

Three different virtual circuits are shown, and for each one a virtual grant is generated at a fixed time interval. The virtual grant is virtual, because the grant timing is virtual. The grant timing corresponds to the ideal time of the next grant which is the time that would result in zero cell delay variation. However, the actual grant time must vary from the ideal in most cases, because the timing of upstream slots 2100 may not coincide with the grants timing. For example, the slot rate may not be an exact multiple of the cell rate, and as the cell rates may be different for each VC, two grants may mature at the same time, as shown in the grants queue 2101 for the second slot 2106. Therefore, the grants may have to wait for an opportunity to go out, resulting in an occasional delay of the actual grants 2102.

FIG. 21 also shows the operation of the virtual framer with respect to the current time 2107. At each current time segment, only one future grant is calculated. For example, as shown in FIG. 21, virtual grant 2103 is already stored as an NCT value, but virtual grant 2104 will be calculated only after grant 2103 has exited the VBR heap 2009 (FIG. 20). Accordingly, the virtual grant technique emulates the operation of a non-distributed ATM port.

Figure 22:
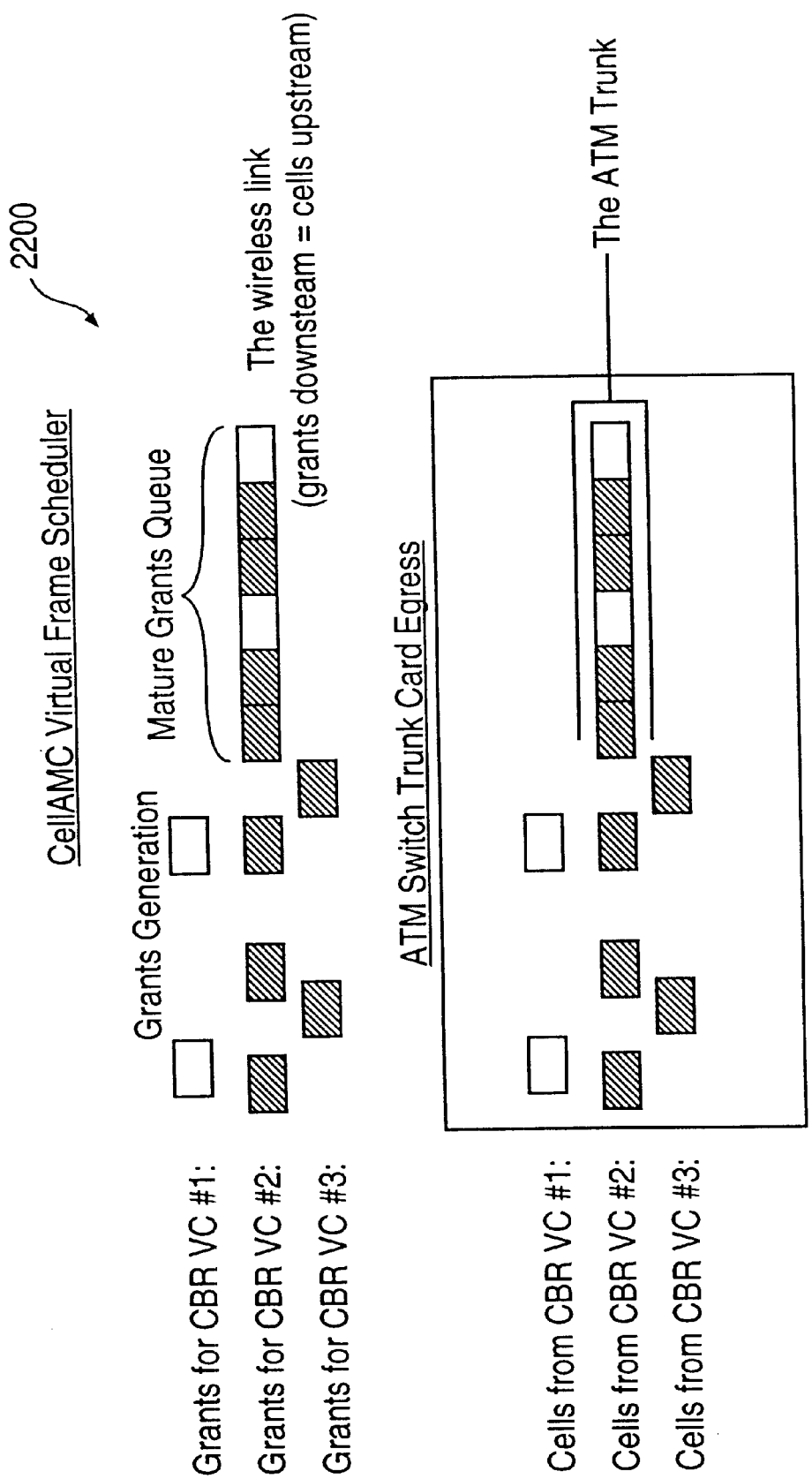
FIG. 22 depicts the operating analogy between the virtual framer of FIG. 21 and a typical ATM switch trunk egress port.

FIG. 22 depicts the operating analogy as indicated by reference numeral 2200 between the virtual framer of FIG. 21 and a typical ATM switch trunk egress port. In particular, FIG. 22 (bottom half) shows ATM cells from periodical CBR services being queued before exiting to an ATM trunk, which represents a typical scenario in an ATM switch trunk card. FIG. 22 (top half) shows the virtual grants and the grants queue, which represents another view of the grants queue 2101 (FIG. 21). Because grants correspond one-to-one to upstream ATM cells, the order of cell arrival in the upstream is the same as that of the virtual frame scheduler, but the virtual framer controls the flow from multiple remote terminals.

FIG. 23 shows VBR and CBR traffic records for the BS grants scheduler of FIG. 20. In particular, FIG. 23 shows a CBR traffic record structure 2304. The record 2005 (FIG. 20) resides in the scheduler SRAM 1704 (FIG. 17). There is one such block for each active VC. To ease access, it may be arranged as a binary tree, written and balanced by the CPU 1710 (FIG. 17). The binary tree may be sorted by the VCI and VPI values. The bit numbers identify the size of each field. The fields of the CBR traffic record structure 2304 are discussed in ascending order of bit numbers. VPI and VCI correspond to the STI/VCI combination of the VC. Channel is the modem channel 1700 (FIG. 17) for the VC. RP and LP are binary tree pointers for the next available records, PP is a pointer to the parent record, and BF is a balance factor, all of which are well known binary tree parameters. Lock is a status bit for the CPU and the scheduler while records are being modified. The fields Increment (INCR), Q, REMAINDER LCT, and leftover relate to the calculation of the NCT and the rate adaptation of the virtual frame time (i.e., the ideal cell rate) with the actual channel slot rate for the VC.

The approach is based on the assumption that the cell time interval can be derived from a common clock (usually a small integer multiple of 8 kHz), multiplied by a rational number. Otherwise, for asynchronous rates, the cell interval can be rounded up to a slightly shorter interval that can be described by a rational number p/q where p and q have an n-bit binary representation (n=18 in a preferred embodiment). The fields INCR, Q, and REMAINDER are written by the CPU and remain constant. The fields LCT and leftover can be modified by the scheduler's NCT controller 2006 (FIG. 20) based on the steps 2400 provided in FIG. 24. Bit number 127 is a CBR-type identifier, PP field is a parent pointer for the binary tree, and the field STATIC PRIOR is a static priority, which is discussed below with respect to FIG. 29.

The approach described above generates precise cell intervals for synchronous CBR services. If precise adaptation of plesiochronous cell rates is desired such that the cell rate is not related to the network clock, then the above scheme can be modified. For example, the nearest rational number cell rate approximation can be used.

The field "REMAINDER" is occasionally incremented or decremented by the CPU 1710 (FIG. 17) or by a modified NCT controller 2006 (FIG. 20). Accordingly, to adapt the cell rate, a feedback mechanism is needed, which is available from the time stamp (TS) field in the MAC overhead, as discussed above with respect to FIG. 10. For example, the CPU can average the TS values of such a flow, or an FPGA accumulator circuit can be added, and as the average time stamp delay deviates from an expected average, the REMAINDER field is adjusted.

The VBR traffic record format 2302 will be discussed later.

Figure 25:
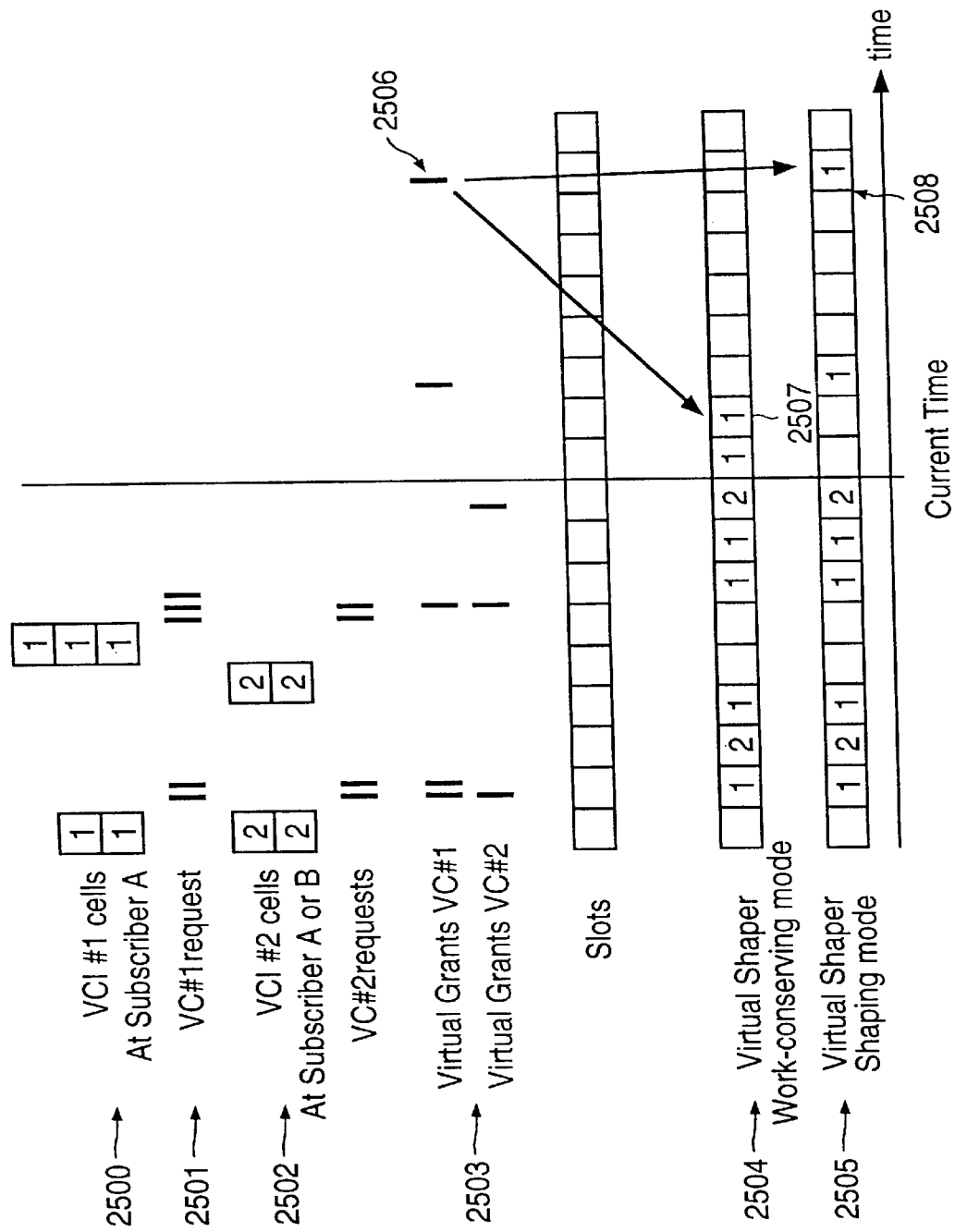
FIG. 25 shows the operation of a virtual shaper in accordance with one embodiment of the present invention.

FIG. 25 shows the operation of a virtual shaper in accordance with one embodiment of the present invention. Cells of VC #1 may arrive in bursts of more than one cell at a time, usually when a large packet is segmented into several cells, as indicated by reference numeral 2500. The requests arrive at the grant scheduler per VC #1 as indicated by reference numeral 2501. Similar events occur for other VCs, such as VC #2 as indicated by reference numeral 2502. If VC #1 has a burst tolerance of two cells, the 5 requests at reference numeral 2501 may exit the virtual shaper as indicated by reference numeral 2503. The grant time is still virtual. If the virtual shaper is to be used for traffic shaping the cell flow in the air interface, the virtual grants timing may be used as the actual grant time, as indicated by reference numeral 2505.

However, in a preferred embodiment, the air interface bandwidth utilization is more important than traffic compliance. Thus, the virtual grant times are used as priority values, but are assigned as early as possible based on the priority. For example, the virtual grant 2506 is assigned much earlier as indicated by reference numeral 2507, providing a work-conserving scheduling discipline. In traffic shaping mode, the grant 2506 will wait for its maturity and then will be scheduled as indicated by reference numeral 2508. In one embodiment, this operation is implemented by allowing the grant to be placed in the CBR heap 2009 (FIG. 20) even though this is VBR traffic.

In the work-conserving mode, the virtual shaper does not maintain traffic conformance, but it still has an important role, because as it virtually shapes multiple VCs, it interleaves the cells of these VCs fairly. Thus, if only one VC is active, the virtual shaper will get grants up to the channel capacity. If two or more VCs are active, the virtual shaper interleaves the flow automatically and fairly. The term "fair" is used to mean sharing the bandwidth in proportion to the traffic capacity allocated to each VC. The "fairness" obtained by a virtual shaper depends on the load sharing objectives of the network operator.

The dual leaky bucket algorithm is a well known algorithm used for shaping traffic flow in ATM networks and included in several ATM Forum interface specifications under the name "Generic Cell Rate Algorithm" (GCRA). In particular, GCRA describes the rules of a leaky bucket algorithm with two parameters L and I, wherein L represents the water level limit and I represents the increment of water level per each cell sent. The L and I values are expressed in time units, assuming that the bucket empties at a fixed rate of one time unit. The original algorithm can be called GCRA (I, L). The GCRA (I, L) algorithm examines if a cell arrival time (TA) complies with the traffic parameters, which are the bucket maximum depth L and increment I, by modifying a variable X for the bucket depth and by checking the time lapsed since the last compliant time (LCT). If X>L, the traffic does not comply.

In accordance with one embodiment of the present invention, a dual-leaky bucket using NCT is calculated on a modified GCRA (I, L) algorithm, and in particular, the next time the cell will comply (NCT) is calculated. The unit of time may be the slot period of the channel. For example, the water depth L (in unit of ATM cells) can be defined as the time it takes to receive L ATM cells. Accordingly, FIG. 27 provides steps 2700 for implementing a dual-leaky bucket algorithm for next compliant time (NCT) calculation in accordance with one embodiment of the present invention. In one embodiment, a variable called "LCT" which is actually the NCT value for compliance with both leaky buckets is outputted. The terms "LCT" and "NCT" are shared in the same memory location (VBR Record 2302, FIG. 23), because NCT of cell I is LCT of cell I+1.

FIG. 28 provides steps 2800 for implementing the single-leaky bucket algorithm for NCT calculation in accordance with another embodiment that results in an approximate weighted fair queuing (WFQ). This is a special case of the technique of FIG. 27. Thus, this embodiment can use the same hardware, but this embodiment approximates a scheduling discipline known as Weighted Fair Queuing (WFQ) in which the channel capacity is shared among the users in proportion to their allocated fraction of bandwidth. Accordingly, if all VCs have the same value of I, and all have an equal number of outstanding requests, this approach will daisy chain the grants, and if I is different for each flow, the grant rate will differ inversely proportional to I.

The VBR section 2302 (FIG. 23) is similar to the CBR section 2304 (FIG. 23) described above with respect to FIG. 23. Both share the same block structure and, thus, can be mixed in the same address space and share the same binary tree. The different fields from CBR are discussed in groups. First, the two leaky buckets parameters are L1, L2, I1, I2, X1, and X2 and are discussed above with respect to FIGS. 27 and 28. Bits 124 and 123 called "PARK" and "EXPIRE", respectively, are used for time overflow control.

Time overflow can occur, because the values "LCT" in both the CBR and VBR records are limited in size and, thus, the LCT value will eventually overflow and appear as a smaller value than previous time counts. In accordance with the present invention, the time overflow is handled by treating the LCT value as a circular counter. Time additions and subtractions are implemented modulo the word size. Thus, the carry is neglected and the borrow is taken if the subtraction result will be negative. When times are compared, such as for finding the earliest time, the LCT values are first compared with the current time TA and the maximum count+1 (the word modulo) "P". If the LCT is earlier than TA-P/2, then it is assumed to indicate a future event to occur at TA+P/2. There is an ambiguity of events that occur too late or too early, but if P represents a long enough time interval (in number of channel slots), e.g., 10 seconds, ambiguity will happen only for events spaced 5 seconds before or after the current time.

Figure 26:
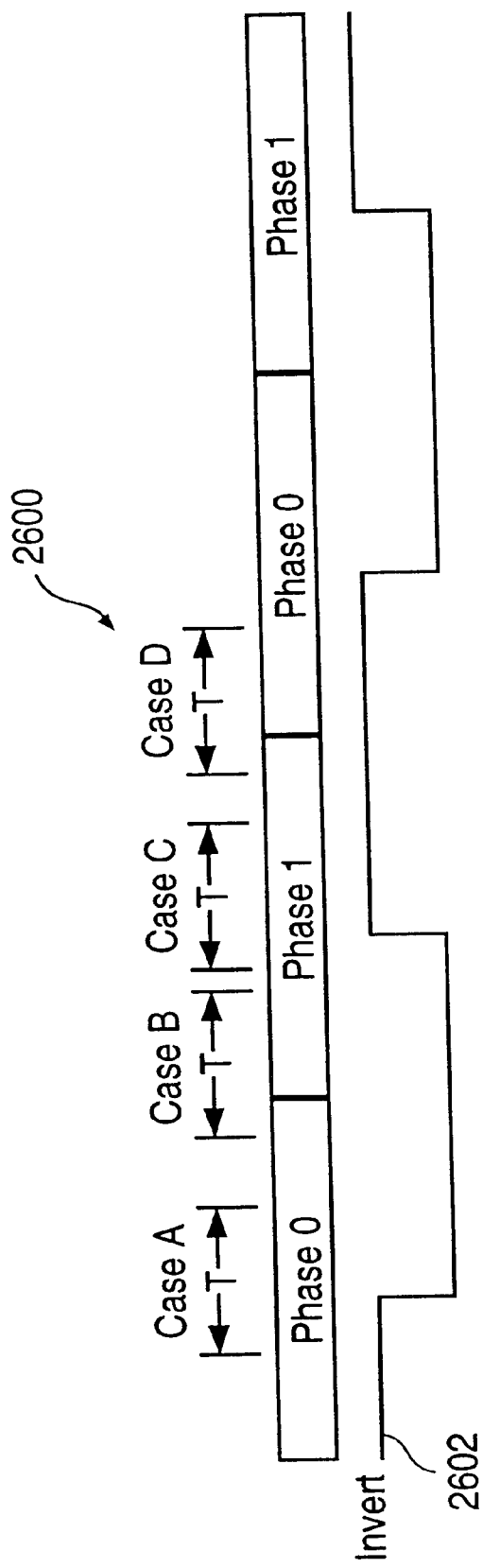
FIG. 26 shows the timing of the most significant bit of the time counter, interpreted as two phases, to avoid the time ambiguity when the binary time count rolls over to zero, in accordance with one embodiment of the present invention.

In a preferred embodiment, a simpler to implement variant is used, in which the most significant bit of the LCT is interpreted as a "phase" based on the most significant bit value of the current time modulo P. An INVERT square wave 2602 is generated with the same frequency at the phase bit but 90 degrees shifted as shown in FIG. 26. If INVERT is zero, LCT (and NCT) values are compared based on regular arithmetic. If INVERT=1, the MSB of each NCT value is inverted before comparison.

FIG. 26 also shows small time intervals 2600, "Case A" through "Case D". All NCT values within each interval are unambiguously comparable. For example, during Case A, initially the INVERT bit is set, thus, all LCT values in region A are compared with their MSB inverted, without loss of consistency. Later, the INVERT bit clears, still all events within A are compared without inverting the MSB, and are still consistent. However, during the end of Case A, events from Case A will appear "later" then events from case "D".

The "Invert" technique requires less hardware, but the calculations of the scheduling algorithms must be done with special arithmetic rules as follows:

The stored parameters X1, LCT, L1 are of two types:

REAL—may include floating point numbers, integers, 2's complement, etc.

The REAL variables are: X1, L1, T1, X2, L2, T2.

XCT—the INVERT signal determines the interpretation of the MSB.

The XCT variables are: TA, LCT, LCT1, LCT2.

Definition of INV(X): invert MSB of X if and only if the INVERT signal is TRUE.

Rule 1: Difference of two XCT numbers.

$C:=X-Y$ where $C$ is type REAL and $X$, $Y$ are XCT.

Implementation:

$C:=INV(X)-INV(Y)$

C may be negative (e.g. by 2's complement arithmetic).

Rule 2: Sum of mixed types.

$Y:=X+C$ where $C$ is type REAL and $X$, $Y$ are XCT.

Implementation:

$Y:=INV(INV(X)+C)$. If $INV(X)+C$ produces carry beyond $2^{18}$, ignore it.

Example from the NCT Algorithm of.

(a) To calculate X1:=X1−LCT1+LCT we rewrite it as:

$X1:=X1-(LCT1-LCT)$

Applying Rule 1:

$X1:=X1-(INV(LCT1)-INV(LCT))$ $X1:=X1-C$ where $C=INV(LCT1)-INV(LCT)$. Now $X1-C$ is a normal operation between REAL types.

(b) To calculate:

$LCT1:=X1+LCT-L1$ we first do the regular REAL operation:

$LCT:=(X1-L1)+LCT$

Now applying Rule 2:

$LCT1:=INV((X1-L1)+INV(LCT))$.

The above technique for clock overflow allows consistent time comparisons in a limited range, which is sufficient for most CBR applications. However, there is a problem with a VBR service that does not transmit a cell for a long time, for example, longer than P. In this case, the leaky bucket should be empty, but since the depth is calculated from the LCT value, the ambiguity of LCT modulo P may appear that LCT is recent or even in the future. To correct this problem, the PARK and EXPIRE bits can be added to the VBR record in FIG. 25, and a refresh mechanism task can be implemented as a background task in the scheduler 1703 based on an address counter. The refresh mechanism reads sequentially all the VBR records. To simplify this task, the refresh mechanism also reads and modifies the CBR records, although it is not necessary, as all CBR services are periodical with intervals much shorter than P. On a first pass, the refresh mechanism sets all the PARK bits (bit 124 in FIG. 23). The process is analogous to a car parking attendant marking the tires of all parked cars. Each pass takes a shorter period than P but longer than ¼ P. In the second pass, if PARK is not cleared, the refresh mechanism sets the EXPIRE bits. Each VBR record visited by the NCT manager 2006 (FIG. 20) performs the following operation before running the NCT algorithm of FIG. 26 or FIG. 27:

```
if (EXPIRED)
{       X1 := 0;
 X2 := 0;
 LCT := TA;
}
PARKED := 0;
EXPIRED := 0;
(perform NCT algorithm as usual).
```

Figure 29:
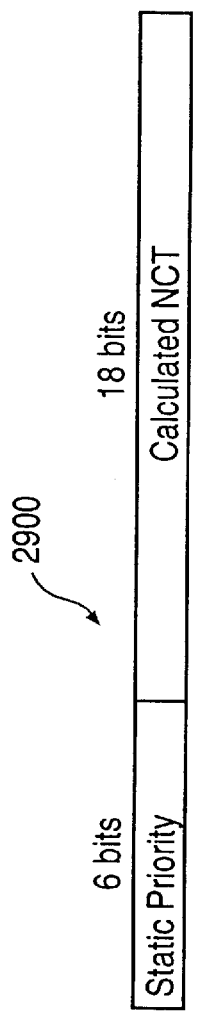
FIG. 29 shows a structure of an NCT that includes static and sorted priority according to one embodiment of the present invention.

FIG. 29 shows the format 2900 of the priority value of each grant in the heap. NCT is an 18-bit word whose MSB is considered the "phase" bit as described above. The 6-bit static priority is in the most significant position and takes precedence over the NCT word, creating effectively multiple static priority queues, each with a sorted priority of NCT values. The CBR queue 2009 (FIG. 20) always has higher priority than the VBR queue 2008 (FIG. 20). Exceptional CBR cells, such as CBR-OAM, are treated as VBR cells with high priority, thus, as a request arrives, they are placed in a VBR queue with static priority 0.

Figure 30:
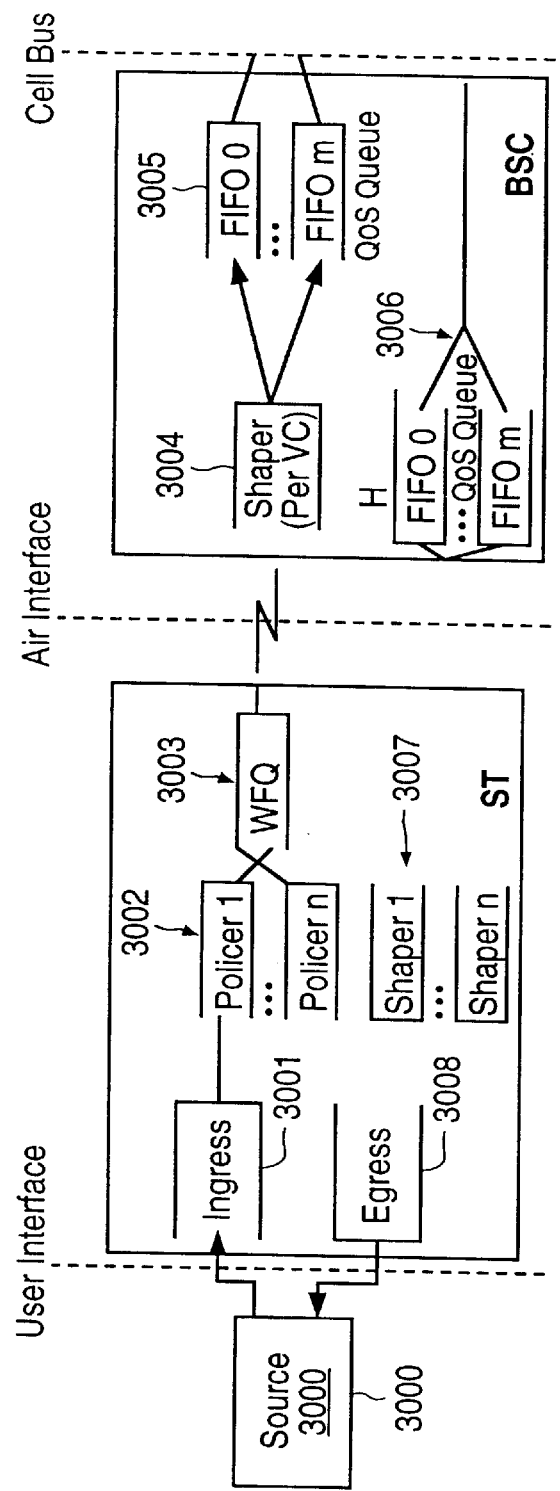
FIG. 30 shows an overall ATM traffic operation in a wireless access network in accordance with one embodiment of the present invention.

The scheduling approach described above was optimized for performance of circuit switched and packet switched traffic over the air interface. FIG. 30 shows an overall traffic flow of a subscriber terminal (ST) and Base Station Controller (BSC) in accordance with one embodiment of the present invention. A user terminal 3000 connected to the ST emits information into an ingress port 3001. The information flows through a traffic policer 3002 which regulates the traffic flow per VC. Depending on the application, the traffic policer 3002 may just mark non-complying cells as high cell loss priority, or the traffic policer 3002 may be configured to reject or delay non-complying cells. The traffic policer 3002 is used in the same manner as in ordinary ATM ingress processing.

The output of the traffic policer 3002 flows to an outgoing cells queue 3003, which represents the entire queuing complex of FIG. 19. The arrival of cells and requests are controlled by the virtual framer and virtual shaper mechanism 3004. The arriving ATM cells then flow to priority queues of backplane 3005 as is standard in ATM switches. In the opposite flow, cells from the backplane wait in QoS queues 3006 to be broadcast to the STs. At each ST they may be held in a traffic shaper and then output to the user terminal 3000 via an egress port 3008. The entire downstream flow as described is similar to the operation of an ordinary ATM switch port except that the air interface limits the flow rate from the BSC backplane to the egress port.

In accordance with one embodiment of the present invention, the multiplexing and signaling of multiple telephony circuits can be implemented as described below with respect to FIG. 31. FIG. 18 described the flow of the user or "bearer" traffic. However, most telephony applications require handling of signaling. The BS 100 (FIG. 1) cannot pass this signaling transparently, because the BS needs to know when to allocate bandwidth in the air for bearer circuits and also perform protocol conversion as described below with respect to FIG. 31.

Figure 31:
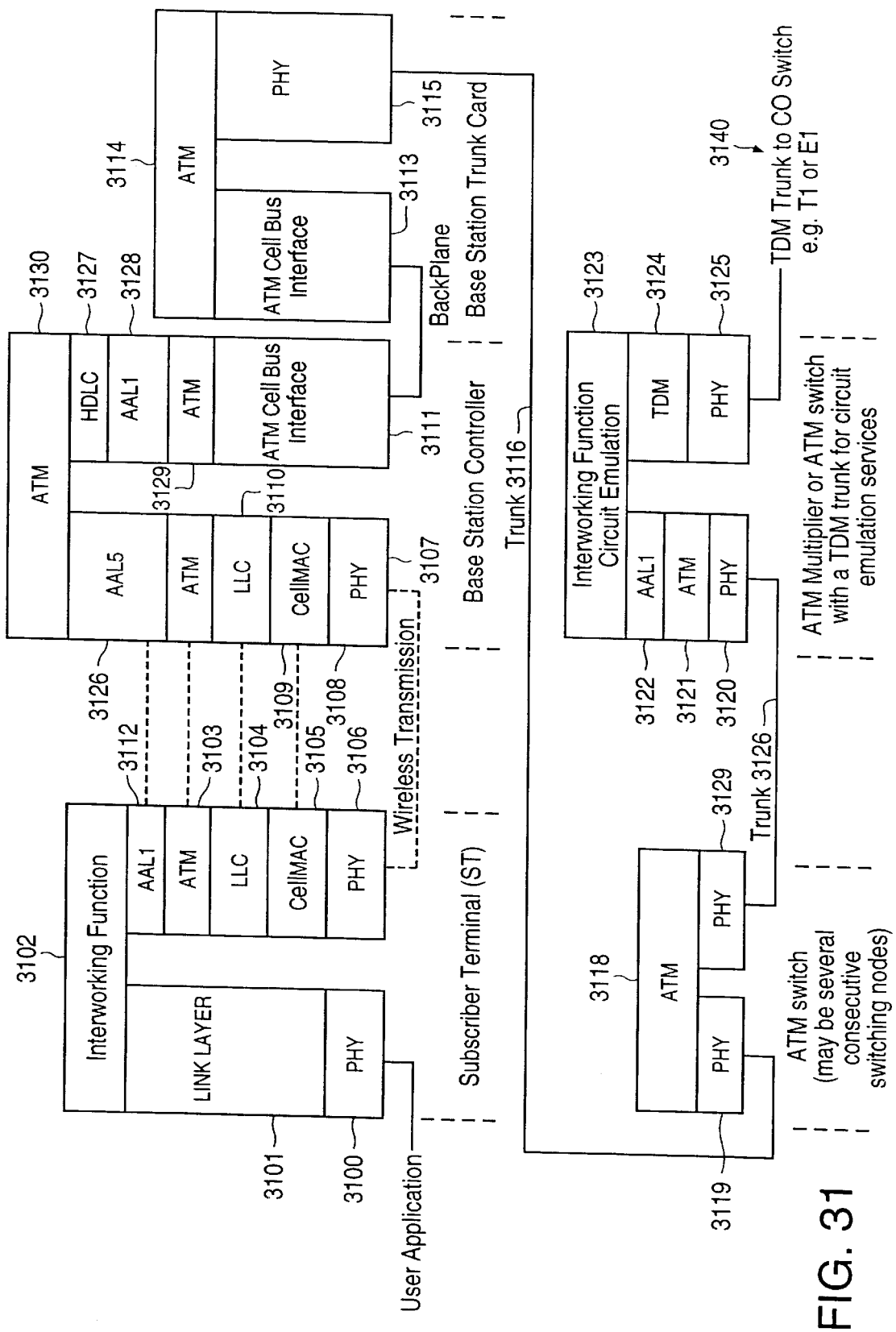
FIG. 31 is a reference model of signaling protocol layers involved in a multiplexing telephony application ATM network access in accordance with one embodiment of the present invention.

FIG. 31 is a reference model of signaling protocol layers involved in a multiplexing telephony application ATM network access in accordance with one embodiment of the present invention and represents processes happening in parallel and in the same equipment as shown in FIG. 18 (described above). The signaling at the user interface is handled by a physical layer 3100 and a link layer 3101, which for ISDN includes the industry standard Q.921 and HDLC protocols for the "D" Channel. An interworking function 3102 interprets the user signaling including the Q.931 protocol and using an AAL5 3112 and lower layers creates a peer communication with a BS interworking function 3130. For example, if the ISDN port requests a phone connection with a phone number, the interworking function 3102 sends a "connect" request to its peer 3130. The peer 3130 allocates air bandwidth for the bearer channel as a CBR service as discussed above.

However, the other network end 3125 is connected to a T1 or E1 trunk that carries the signaling of all channels (not just the user) in one common "D" channel. Two industry standard protocols used for common channel signaling are TR303 for T1 and V5.2 for E1. Therefore, the interworking function 3130 converts the "Connect" request to an equivalent connect request for a particular protocol. The message needs to appear in the "D" channel of a trunk 3140, which is a TDM channel dedicated for signaling. The interworking function 3130 uses an HDLC 3127 and an AAL1 3128 to create a virtual CBR channel with the trunk 3140. The CBR cells traverse the network from an ATM cell bus interface 3111 to the trunk 3140 just like the user channels. The end equipment interworking function 3123 does not need to be aware of the BS interworking function 3130, because the networking function is only used for ATM to TDM conversion. Similarly, for incoming calls, the D channel of the trunk 3140 is converted to a CBR virtual circuit that travels to the AAL1 SAR 3128. Although FIG. 31 is a reference model, each layer corresponds to a real module of hardware, software or both. For example, in one embodiment, the AAL1 SAR 3128 corresponds to the SAR module 1706 (FIG. 17), the HDLC 3127 corresponds to the device 1714 (FIG. 17), and the interworking function can be performed in the CPU 1710 (FIG. 17).

The above description of the present invention is illustrative and not limiting. Other embodiments of the present invention will be apparent to one of ordinary skill in the art in light of the above disclosure. Accordingly, the scope of the invention should be determined by the appended claims and their legal equivalents.

We claim:

1. A base sector controller subsystem including:
   a MAC layer processor;
   a scheduler for receiving requests that include virtual circuit identifier information, broadcasting grants that include virtual circuit identifier information in response to said received requests, generating requests on behalf of a virtual circuit of a wireless ATM network, and broadcasting grants that include identifier information of said virtual circuit in response to the generated requests;

an ATM cell bus attached to said MAC layer processor; and an interface for connecting to other subsystems.

2. A base sector controller subsystem as in claim 1, wherein said scheduler sorts said requests based on the priority of each virtual circuit of the wireless ATM network.

3. A base sector controller subsystem as in claim 2, wherein said scheduler includes a virtual shaper.

4. A base sector controller subsystem as in claim 2, wherein said scheduler includes a virtual framer.

5. A base sector controller subsystem as in claim 1 further including:

a CPU;

one or more SAR circuits;

means for passing ATM cells between said SAR circuits and said ATM cell bus; and means for transferring information between said SAR circuits and said CPU.

6. A base sector controller subsystem as in claim 1 further including:

a request or a grant processor that includes a memory and a buffer.

7. The base sector controller subsystem of claim 1, wherein grants broadcasted in response to the generated requests are request-less grants, and wherein said request-less grants are distinct from grants broadcasted in response to said received requests.

8. A method of processing requests in a wireless ATM network including steps for:

extracting requests from an upstream transmission;

generating requests in a virtual framer;

queuing said extracted and generated requests;

sorting said extracted and generated requests based on a virtual shaper;

providing a grant to at least one of said extracted requests with the highest priority; and providing periodically another grant to at least one of said generated requests.

9. The method of claim 8, wherein the grant provided to at least one of said generated requests is a request-less grant, wherein said request-less grant is distinct from a grant provided in response to at least one of said extracted requests.

10. The method of claim 8, wherein both grants are provided to the same virtual circuit of the wireless ATM network.

11. A structure for processing requests in a wireless ATM network including:

means for extracting requests from an upstream transmission;

means for generating requests in a virtual framer;

means for queuing said extracted and generated requests;

means for sorting said extracted and generated requests based on a virtual shaper;

means for providing a grant to at least one of said extracted requests with the highest priority; and means for providing periodically another grant to at least one of said generated requests.

* * * * *